United States Patent
Morohoshi et al.

(10) Patent No.: US 8,337,607 B2
(45) Date of Patent: Dec. 25, 2012

(54) RECORDING INK, RECORDING MEDIUM, INK MEDIA SET, INK RECORDED MATTER, INK JET RECORDING METHOD, AND INK JET RECORDING APPARATUS

(75) Inventors: Naoya Morohoshi, Numazu (JP); Tohru Ohshima, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 12/716,607

(22) Filed: Mar. 3, 2010

(65) Prior Publication Data

US 2010/0215855 A1    Aug. 26, 2010

Related U.S. Application Data

(62) Division of application No. 12/090,751, filed on Apr. 18, 2008.

(30) Foreign Application Priority Data

Oct. 20, 2005 (JP) ................................. 2005-305513
Jan. 23, 2006 (JP) ................................. 2006-014104

(51) Int. Cl.
C09D 11/02 (2006.01)

(52) U.S. Cl. ................. 106/31.27; 106/31.6; 106/31.58; 106/31.65; 106/31.86; 106/31.43; 106/31.75

(58) Field of Classification Search ............... 106/31.27, 106/31.6, 31.65, 31.58, 31.86, 31.43, 31.75
See application file for complete search history.

(56) References Cited

U.S. PATENT DOCUMENTS

| | | | | |
|---|---|---|---|---|
| 5,429,860 A * | 7/1995 | Held et al. | ................... | 428/32.3 |
| 5,537,137 A * | 7/1996 | Held et al. | ..................... | 347/105 |
| 5,616,409 A * | 4/1997 | Matsuda et al. | ........... | 428/32.18 |
| 5,772,742 A * | 6/1998 | Wang | .......................... | 106/31.27 |
| 6,821,330 B1 | 11/2004 | Sano et al. | | |
| 2001/0036552 A1 * | 11/2001 | Otani et al. | ................ | 428/411.1 |

(Continued)

FOREIGN PATENT DOCUMENTS

EP      0 181 198 A2    5/1986

(Continued)

OTHER PUBLICATIONS

Supplementary Search Report issued Feb. 18, 2011, in European Patent Application No. 06822289.2-2304 / 1937485.

(Continued)

*Primary Examiner* — Patricia L. Hailey
*Assistant Examiner* — Veronica F Faison
(74) *Attorney, Agent, or Firm* — Oblon, Spivak, McClelland, Maier & Neustadt, L.L.P.

(57) ABSTRACT

The present invention provides an ink-media set, record printed by use of the ink-media set, an inkjet printing method, and an inkjet printing apparatus which includes ink that has at least water, dye, and humectant and surface tension thereof is 20 to 35 mN/m at 25° C., a support, and a recording medium having the support and at least one surface thereof has a coating layer wherein transfer rate of the ink to the recording medium measured by a dynamic scanning absorptometer in 100 ms of contact time is 4 to 15 ml/m² and transfer rate of the ink to the recording medium measured by a dynamic scanning absorptometer in 400 ms of contact time is 7 to 20 ml/m².

19 Claims, 16 Drawing Sheets

U.S. PATENT DOCUMENTS

| | | |
|---|---|---|
| 2003/0107632 A1 | 6/2003 | Arita et al. |
| 2004/0046846 A1 | 3/2004 | Pistagna et al. |
| 2004/0082685 A1 | 4/2004 | Soga et al. |
| 2004/0157009 A1 | 8/2004 | Ohbayashi et al. |
| 2005/0054751 A1 | 3/2005 | Namba et al. |
| 2005/0204954 A1 | 9/2005 | Pistagna et al. |
| 2006/0082631 A1 | 4/2006 | Adachi |
| 2006/0181587 A1* | 8/2006 | Bauer et al. .................... 347/100 |
| 2007/0106962 A1* | 5/2007 | Sakakibara et al. ............... 716/1 |
| 2008/0273045 A1 | 11/2008 | Morohoshi et al. |

FOREIGN PATENT DOCUMENTS

| | | |
|---|---|---|
| EP | 0 206 286 A1 | 12/1986 |
| EP | 1 380 622 A1 | 1/2004 |
| EP | 1 437 227 A1 | 7/2004 |
| JP | 55-029546 | 3/1980 |
| JP | 55-80477 | 6/1980 |
| JP | 56-49771 | 5/1981 |
| JP | 56-57862 | 5/1981 |
| JP | 57-102970 | 6/1982 |
| JP | 57-102971 | 6/1982 |
| JP | 61-159470 | 7/1986 |
| JP | 62-48774 | 3/1987 |
| JP | 11-323221 | 11/1999 |
| JP | 2003-96345 | 4/2003 |
| JP | 2003-213179 | 7/2003 |
| JP | 2003-327880 | 11/2003 |
| JP | 2004-225018 | 8/2004 |
| WO | WO 2004/091916 A1 | 10/2004 |

OTHER PUBLICATIONS

Japanese Office Action issued Aug. 2, 2011, in Patent Application No. 2006-285267.

Japanese Office Action issued Nov. 22, 2011, in Patent Application No. 2006-285267.

* cited by examiner

4

3

2

1

RECORDING INK, RECORDING MEDIUM, INK MEDIA SET, INK RECORDED MATTER, INK JET RECORDING METHOD, AND INK JET RECORDING APPARATUS

REFERENCE TO RELATED APPLICATIONS

The present application is a Divisional of U.S. application Ser. No. 12/090,751, filed Apr. 18, 2008, and claims priority to Japanese Applications JP 2005-305513, filed Oct. 20, 2005 and JP 2006-014104, filed Jan. 23, 2006, the entire contents of each of which are hereby incorporated by reference.

TECHNICAL FIELD

The present invention relates to recording inks, recording media, ink-media sets, ink recorded matter, inkjet recording methods, and inkjet recording apparatuses, which allow to record high-quality images similar to commercial printing by use of offset printing.

BACKGROUND ART

Conventionally, inkjet printing has been utilized as superior printing methods applicable to wide variety of recording media and thus vigorous developments have been conducted in terms of recording devices, recording methods, recording materials.

However, inkjet recording apparatuses, having been developed and commercialized heretofore, have to use specific recording media developed for inkjet such as inkjet printing papers or inkjet transparency films or obtaining; (i) good fixation of ink, (ii) so-called "clear" recorded images without blur or bleeding (hereinafter occasionally referred to as "feathering") around letters or pictures of the images, and (iii) recorded images having high optical density (OD) is difficult. That is, when a recording medium such as paper generally used in offices or homes such as plain paper copier (PPC), letter paper, bond paper, postcard, writing paper, envelope, or report pad, or transparency film (OHP films) commercially available on the market is used, it becomes difficult to simultaneously satisfy the above mentioned (i) to (iii).

Because inkjet printing papers are generally expensive and the inkjet printing papers are coated only on one side thereof, when images are recorded on the other side on which coating has not been conducted, fixation of the image and quality of printed letters significantly decrease. This is one of the reasons why inkjet printing apparatus is not widely used.

Therefore, many trials have been made to obtain; (i) good fixation of ink, (ii) so-called "clear" recorded images without bleeding or feathering around letters or pictures of the images, and (iii) recorded images having high optical density (OD).

For example, following methods have been proposed: (1) using strong alkaline ink having a pH of around 13 (see Patent Literatures 1 to 3), (2) performing recording by heating ink which is solid in room temperature to melt and to be discharged (see Patent Literatures 4 and 5), and (3) performing recording by use of oil-based ink that uses water-insoluble organic solvent as a fluid medium.

Moreover, with regard to the method to obtain good fixation of ink in the above mentioned (i), following methods have been proposed: (4) using ink having a large amount of surface acting agent (see Patent Literature 6), (5) using ink which is a mixture of glycerin, N-methyl-2-pyrrolidon, direct dye, and small amount of surface acting agent having low surface tension, the amount less than the critical micelle concentration (CMC) (see Patent Literature 7), (6) using ink of which pH is strong alkaline and added a fluorine-containing surfactant (see Patent Literatures 1 and 3) and the like.

However, regarding the method (1), since the ink is a strong alkali, there is a risk in handling the ink. Moreover, the ink is fixed well and has a good level of printing on acid paper which uses rosin or the like as size agent, but fixation significantly decreases when used with acid-free paper using alkyl ketene dimer, anhydrous stearic acid or the like, of which production has been recently increasing in Japan. Furthermore, there is a tendency that the quality of printing also is deteriorated a little. In addition, since the strong alkaline ink has a strong osmotic force, the ink may easily penetrate to the opposite side of the paper, causing difficulty in performing printing on the both sides of the paper.

The method (2) is an excellent method which satisfies the above mentioned (i) to (iii) simultaneously. However, it has such problems as the printed part rises and when the printed materials are allowed to accumulate, the printed letters are transferred to other paper or papers stick together. Moreover, as a unit to heat ink is required, the recording apparatus becomes complex.

The method (3) is superior in fixation of ink. However, this method requires measurements to deal with the smell and safety of organic solvent contained in ink. Therefore, this method is used only for industrial purposes, e.g., printing lot number in the bottom of a can, and is not used in an office or home.

The method of using ink described in (4) has a problem in the quality of printing as clarified in Patent Literatures 7 and 8 and therefore is not a good method.

The method of using ink described in (5) has a better fixation of ink compared with the conventional ones. As described in its embodiment, drying rate (hereinafter occasionally referred to as fixation) of the ink is 8 to 15 seconds. However, for the user of the recording apparatus, the 8 to 15 seconds are long and depending on the paper used, if the paper is grabbed by hand immediately after the printing, the hand may get dirty by the ink. Moreover, depending on the type of the paper, feathering occurs noticeably and therefore further improvement is required to this method.

The method of using ink described in (6) allows the time for fixation to be within 5 seconds, but similarly to the above mentioned method of (1), it has problems in its safety, fixation and quality of printing on the acid-free paper, and osmotic force of ink to the opposite side of the paper; therefore, this method is not suitable.

Meanwhile, considering the usage in an office or home and smell, safety, handling easiness of ink, and the like, it is preferable to use water-based ink as the ink for the inkjet. Such water-based ink has a tendency to cause feathering on the part of recoding medium when fingerprint or the like is left thereon. Moreover, depending on the type of paper, quality of printing may significantly differ on the front and backside of the paper. Therefore, when the recording medium is set in an inkjet recording apparatus, due attention must be paid in the handling of the recording medium.

Moreover, for example, in a multi-nozzle type inkjet recording is apparatus using water-based ink including 1 to 5% by mass of water-soluble dye and 20 to 50% by mass of water-soluble organic solvent such as glycol, and having surface tension of almost 40 to 55 mN/m, because of the evaporation of water or the like from nozzles, clogging of a nozzle which does not perform the printing (a nozzle which is not used in printing) may occur in the course of a printing procedure. For example, when "1" is printed after printing "-" continuously for about 120 seconds, the nozzles which were used for the printing of "-" normally discharges ink, but other nozzles do not discharge ink and therefore "1" cannot be printed correctly.

In addition, if the inkjet recording apparatus is left unused after the printing for about, for example, two days, assuming the weekend, ink is often not discharged. This is assumed to be due to increased viscosity of ink caused by evaporation of water from nozzles. This causes a user of the inkjet recording apparatus to perform the operation of solving the no-discharge phenomenon every time the user begins to use the apparatus. Such troubles are relatively more often seen in inkjet recording apparatus that uses relatively less energy to spray the ink, e.g., more often in a foam jet type recording apparatus than an inkjet recording apparatus using a piezo element.

To solve the above mentioned problems, it becomes necessary to incorporate various recovery devices such as a cap, a pump and the like in an inkjet recoding apparatus. This is one of the reasons why the inkjet recording apparatus becomes complex and expensive.

Follow are the problems that papers (recording media) used for inkjet methods currently have:

(1) PPC or other ordinary paper causes blurs and feathering around letters and images and so-called "clear" images cannot be obtained, though the paper has been improved much compared to the conventional one. In addition, image density (optical density: OD) is not sufficient.

(2) Images printed on inkjet paper, or matt coated paper for inkjet, has a relatively high resolution and high image density, but images become matt-like and are not glossy, differently from one printed by an offset printing apparatus.

(3) Glossy inkjet paper enables a user to obtain glossy and high quality image close to silver halide photography when dye-based ink is used, but the price of the medium is so expensive that it is hard to be used in an office or for general industrial purposes.

(4) Coated paper for offset printing is produced much and relatively cheap. However, usability with inkjet has not been considered and therefore the paper has insufficient absorbability of ink and offset blots cause by beading, bleed, or spur, pinholes caused by spur (hereinafter occasionally referred to as "spur mark") or the like may occur. In addition, the paper has insufficient ink drying property, too.

Therefore, the conventional technology has not yet provided an inkjet recording apparatus that allows its user to obtain (i) so-called "clear" and glossy recorded image without blur, feathering, or bleed around letters or pictures and has excellent printing quality, (ii) recorded images having high optical density (OD), and (iii) image having high uniformity that does not include beading in the solid parts. Also, the apparatus needs to satisfy such characteristics as ink fixation, sharp image, image density, transportability of recording medium, and the like. Such an apparatus has not been proposed yet and further improvement and development of the apparatus is currently demanded.

Patent Literature 1: Japanese Patent Application Laid-Open (JP-A) No. 56-57862
Patent Literature 2: JP-A No. 57-102970
Patent Literature 3: JP-A No. 57-102971
Patent Literature 4: JP-A No. 61-159470
Patent Literature 5: JP-A No. 62-48774
Patent Literature 6: JP-A No. 55-29546
Patent Literature 7: JP-A No. 56-49771
Patent Literature 8: JP-A No. 55-80477

DISCLOSURE OF INVENTION

The present invention aims at providing a recording medium, ink-media set, an ink recorded matter, an inkjet recording method, and an inkjet recording apparatus that make it possible to obtain (i) so-called "clear" and glossy recorded image without blur, feathering, or bleed around letters or pictures and has excellent printing quality, (ii) recorded images having high optical density (OD), and (iii) image having high uniformity that does not include beading in the solid parts.

The problems described above can be solved by the present invention explained in the following.

<1> A recording ink, containing water, a colorant and a humectant, wherein the recording ink has a surface tension of 20 mN/m to 35 mN/m at 25° C., and the transfer rate of the recording ink onto a recording medium, having a coating layer on at least one surface of its support, is 4 ml/m$^2$ to 15 ml/m$^2$ in 100 ms of contact time and the transfer rate of the recording ink onto the recording medium is 7 ml/m$^2$ to 20 ml/m$^2$ in 400 ms of contact time measured by a dynamic scanning absorptometer.

<2> The recording ink according to the item <1>, wherein the colorant is one selected from pigments having an anionic hydrophilic group and pigments coated with a polymer having an anionic hydrophilic group.

<3> The recording ink according to the item <2>, wherein the volume average particle size of the pigment is 0.01 μm to 0.16 μm.

<4> The recording ink according to the item <1>, wherein the colorant is colored fine particles that include at least one of pigments and dyes.

<5> The recording ink according to the item <4>, wherein the volume average particle size of the colored fine particles is 0.01 μm to 0.16 μm.

<6> The recording ink according to any one of the items <1> to <5>, wherein the humectant is at least one selected from the group consisting of polyol compounds, lactam compounds, urea compounds and saccharides.

<7> The recording ink according to the item <6>, wherein the polyol compound is at least one selected from the group consisting of glycerin, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,4-butanediol, 1,5-pentanediol, 1,6-hexanediol, 2-methyl-2,4pentanediol, 1,2,4-butanetriol, 1,2,6-hexanetriol, thiodiglycol, pentaerythritol, trimethylolethane and trimethylolpropane.

<8> The recording ink according to any one of the items <6> and <7>, wherein the lactam compound is as least one selected from 2-pyrrolidone, N-methyl-2-pyrrolidone, N-hydroxyethyl-2-pyrrolidone and ε-caprolactam.

<9> The recording ink according to any one of the items <1> to <8>, wherein the content of the humectant is 10% by mass to 50% by mass in the recording ink.

<10> The recording ink according to any one of the items <1> to <9>, wherein the recording ink further contains a wetting agent, and the wetting agent is one selected from polyol compounds and glycol ether compounds having a carbon number of 8 or more.

<11> The recording ink according to the item <10>, wherein the polyol compound having a carbon number of 8 or more is at least one of 2-ethyl-1,3-hexanediol and 2,2,4-trimethyl-1,3-pentanediol.

<12> The recording ink according to any one of the items <1> to <11>, wherein the recording ink further contains a surfactant and the surfactant is at least one expressed by the following general formulas (I) to (VI):

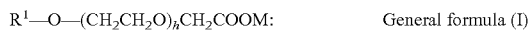
General formula (I)

in the general formula (I), $R^1$ represents an alkyl group; h represents an integer from 3 to 12; M represents one selected from alkali metal ions, quaternary ammoniums, quaternary phosphoniums and alkanolamines;

General Formula (II)

in the general formula (II), $R^2$ represents an alkyl group; M represents one selected from alkali metal ions, quaternary ammoniums, quaternary phosphoniums, and alkanolamines;

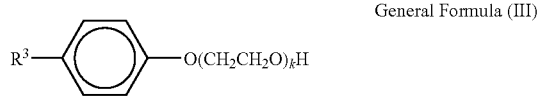
General Formula (III)

in the general formula (III), $R^3$ represents a hydrocarbon group; k represents an integer from 5 to 20;

General formula (IV)

in the general formula (IV), $R^4$ represents a hydrocarbon group; j represents an integer from 5 to 20;

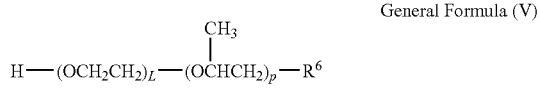
General Formula (V)

in the general formula (V), $R^6$ represents a hydrocarbon group; L and p represent each an integer from 1 to 20;

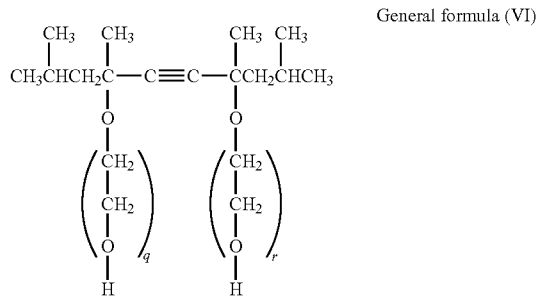
General formula (VI)

in the general formula (VI), q and r represent each an integer from 0 to 40.

<13> The recording ink according to any one of the items <1> to <12>, wherein the recording ink has a viscosity of 5 mPa·s or more at 25° C.

<14> A recording medium, containing a support and a coating layer on at least one surface of its support, wherein the transfer rate of pure water onto the recording medium is 2 ml/m² to 26 ml/m² in 100 ms of contact time and the transfer rate of pure water onto the recording medium is 3 ml/m² to 29 ml/m² in 400 ms of contact time measured by a dynamic scanning absorptometer.

<15> An ink-media set, containing a recording ink according to any one of the items <1> to <13> and a recording medium according to claim 14.

<16> An ink-media set, containing recording inks, and a recording medium, wherein each of the recording inks contains water, a colorant and a humectant and has a surface tension of 20 mN/m to 35 mN/m at 25° C.; the recording medium contains a support, and a coating layer on at least one surface of its support; the transfer rate of the recording ink onto the recording medium is 4 ml/m² to 15 ml/m² in 100 ms of contact time and the transfer rate of the recording ink onto the recording medium is 7 ml/m² to 20 ml/m² in 400 ms of contact time measured by a dynamic scanning absorptometer.

<17> The ink-media set according to the item <16>, wherein the transfer rate of pure water onto the recording medium in 100 ms of contact time measured by a dynamic scanning absorptometer is 2 ml/m² to 26 ml/m², and the transfer rate of pure water onto the recording medium in 400 ms of contact time is 3 ml/m² to 29 ml/m².

<18> The ink-media set according to any one of the items <16> to <17>, wherein the colorant is one selected from pigments having an anionic hydrophilic group and pigments coated with a polymer having an anionic hydrophilic group.

<19> The ink-media set according to the item <18>, wherein the volume average particle size of the pigment is 0.01 μm to 0.16 μm.

<20> The ink-media set according to any one of the items <16> to <17>, wherein the colorant is colored fine particles that include at least one of pigments and dyes.

<21> The ink-media set according to the item <20>, wherein the volume average particle size of the colored fine particles is 0.01 μm to 0.16 μm.

<22> The ink-media set according to any one of the items <16> to <21>, wherein the humectant is at least one selected from the group consisting of polyol compounds, lactam compounds, urea compounds and saccharides.

<23> The ink-media set according to the item <22>, wherein the polyol compound is at least one selected from the group consisting of glycerin, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,4-butanediol, 1,5-pentanediol, 1,6-hexanediol, 2-methyl-2,4pentanediol, 1,2,4-butanetriol, 1,2,6-hexanetriol, thiodiglycol, pentaerythritol, trimethylolethane and trimethylolpropane.

<24> The ink-media set according to any one of the items <22> and <23>, wherein the lactam compound is as least one selected from 2-pyrrolidone, N-methyl-2-pyrrolidone, N-hydroxyethyl-2-pyrrolidone and ε-caprolactam.

<25> The ink-media set according to any one of the items <16> to <24>, wherein the content of the humectant is 10% by mass to 50% by mass in the recording ink.

<26> The ink-media set according to any one of the items <16> to <25>, wherein the recording ink further contains a wetting agent, and the wetting agent is one selected from polyol compounds and glycol ether compounds having a carbon number of 8 or more.

<27> The ink-media set according to the item <26>, wherein the polyol compound having a carbon number of 8 or more is at least one of 2-ethyl-1,3-hexanediol and 2,2,4-trimethyl-1,3-pentanediol.

<28> The ink-media set according to any one of the items <16> to <27>, wherein the recording ink further contains a surfactant and the surfactant is at least one expressed by the following general formulas (I) to (VI):

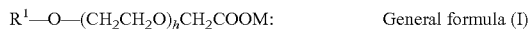
General formula (I)

in the general formula (I), $R^1$ represents an alkyl group; h represents an integer from 3 to 12; M represents one selected from alkali metal ions, quaternary ammoniums, quaternary phosphoniums and alkanolamines;

General formula (II)

in the general formula (II), $R^2$ represents an alkyl group; M represents one selected from alkali metal ions, quaternary ammoniums, quaternary phosphoniums, and alkanolamines;

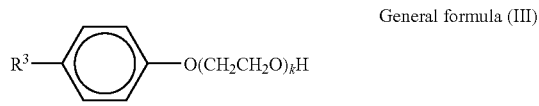
General formula (III)

in the general formula (III), $R^3$ represents a hydrocarbon group; k represents an integer from 5 to 20;

General formula (IV)

in the general formula (IV), $R^4$ represents a hydrocarbon group; j represents an integer from 5 to 20;

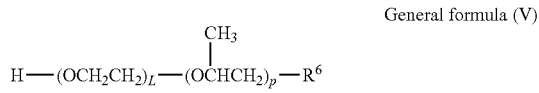
General formula (V)

in the general formula (V), $R^6$ represents a hydrocarbon group; L and p represent each an integer from 1 to 20;

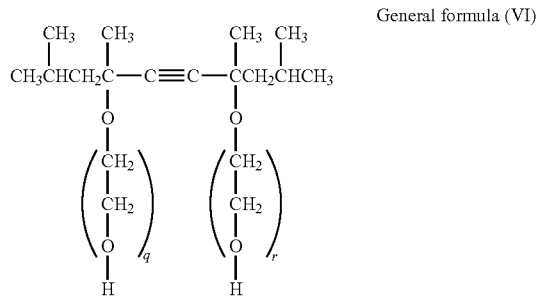
General formula (VI)

in the general formula (VI), q and r represent each an integer from 0 to 40.

<29> The ink-media set according to any one of the items <16> to <28>, wherein the recording ink has a viscosity of 5 mPa·s or more at 25° C.

<30> An ink cartridge, containing a container to contain each ink in the ink-media set according to any one of the items <16> to <29>.

<31> An inkjet recording apparatus, containing at least an ink-ejecting unit configured to eject each ink in the ink-media set according to any one of the items <16> to <29> by stimulating the each ink to thereby record an image onto a recording medium in the ink-media set according to any one of the items <16> to <29>.

<32> The inkjet recording apparatus according to the item <31>, wherein the stimulating is carried out by applying at least one selected from heat, pressure, vibration and light.

<33> An inkjet recording method, including stimulating each ink in the ink-media set according to any one of the items <16> to <29> and ejecting the each ink onto a recording medium in the ink-media set to thereby record an image on the recording medium.

<34> The inkjet recording method according to the item <33>, wherein the applied amount of the ink is 8 g/m² to 20 g/m² at a maximum when the resolution is 300 dpi or higher.

<35> The inkjet recording method according to any one of the items <33> and <34>, wherein an ink-repellent layer is provided on a plate surface on which an ink-ejecting aperture of an inkjet head is formed for spraying the ink.

<36> The inkjet recording method according to the item <35>, wherein the ink-repellent layer contains any one of a fluorine material and a silicone material.

<37> The inkjet recording method according to any one of the items <35> and <36>, wherein the surface roughness (Ra) of the ink-repellent layer is 0.2 μm or less.

<38> The inkjet recording method according to any one of the items <35> to <37>, wherein the area of the aperture's cross-section perpendicular to the center line of the aperture increases gradually along with the distance from the plate surface at around the ink-ejecting aperture.

<39> The inkjet recording method according to any one of the items <35> to <38>, wherein the thickness of the ink-repellent layer is 1 Å (0.1 nm) or more.

<40> The inkjet recording method according to any one of the items <35> to <39>, wherein the critical surface tension of the ink-repellent layer is 5 mN/m to 40 mN/m.

<41> An ink recorded matter, having an image recorded on a recording medium in the ink-media set according to any one of the items <16> to <29> using a recording ink in the ink-media set.

The recording ink according to the present invention comprises at least water, a colorant and a humectant, the recording ink has a surface tension of 20 mN/m to 35 mN/m at 25° C., and the transfer rate of the recording ink onto a recording medium, having a coating layer on at least one surface of its support, is 4 ml/m² to 15 ml/m² in 100 ms of contact time and the transfer rate of the recording ink onto the recording medium is 7 ml/m² to 20 ml/m² in 400 ms of contact time measured by a dynamic scanning absorptometer.

The recording ink according to the present invention has a surface tension within a certain range and a certain transfer rate onto a recording medium having a coating layer on at least one surface of its support, which can bring about high-quality recording of (i) letters with so-called "clear edge", or excellent and glossy recorded images with superior printing quality without blur, feathering and bleed at surround of images, (ii) recorded images with higher optical densities, and (iii) highly uniform images without beading at flat-thick portions.

The recording medium according to the present invention comprises a support and a coating layer on at least one surface of its support, wherein the transfer rate of pure water onto the recording medium is 4 ml/m² to 26 ml/m² in 100 ms of contact time and the transfer rate of pure water onto the recording medium is 5 ml/m² to 29 ml/m² in 400 ms of contact time measured by a dynamic scanning absorptometer. The recording medium according to the present invention can lead to high-quality recording of (i) letters with so-called "clear edge", or excellent and glossy recorded images with superior printing quality without blur, feathering and bleed at surround of images, (ii) recorded images with higher optical densities, and (iii) highly uniform images without beading at flat-thick portions.

The ink-media set according to a first embodiment of the present invention contains the recording ink according to the present invention and the recording medium according to the present invention.

The ink-media set according to a second embodiment of the present invention contains recording inks, and a recording medium, wherein each of the recording inks contains water, a colorant and a humectant and has a surface tension of 20 mN/m to 35 mN/m at 25° C.; the recording medium comprises a support, and a coating layer on at least one surface of its support; the transfer rate of the recording ink onto the recording medium is 4 ml/m$^2$ to 15 ml/m$^2$ in 100 ms of contact time and the transfer rate of the recording ink onto the recording medium is 7 ml/m$^2$ to 20 ml/m$^2$ in 400 ms of contact time measured by a dynamic scanning absorptometer.

The ink-media set according to the first and second embodiments of the present invention combines a recording media having a texture similar to that of coat paper for offset printing and a certain liquid-absorbability as well as an ink with a certain surface tension, which can allow high-quality recording of (i) letters with so-called "clear edge", or excellent and glossy recorded images with superior printing quality without blur, feathering and bleed at surround of images, (ii) recorded images with higher optical densities, and (iii) highly uniform images without beading at flat-thick portions.

BEST MODE FOR CARRYING OUT THE INVENTION (Recording Ink)

The recording ink according to the present invention comprises at least water, a colorant and a humectant, and also a wetting agent, a surfactant, and other optional ingredients as required.

Surface tension of the ink is between 20 and 35 mN/m, preferably between 23 and 34 mN/m. When the surface tension is 20 mN/m or smaller, bleed on the recording medium of the present invention becomes clear due to the exceedingly wet nozzle plate with the ink and stable discharge of the ink may not be obtained. When the surface tension is 35 mN/m or higher, ink does not sufficiently penetrate the recording medium, which may lead to occurrence of beading and lengthened drying time.

Here, the surface tension can be measured by use of, for example, Full Automatic Surface Tensiometer (CBVP-Z, Kyowa Interface Science Co., Ltd) with a platinum plate in the temperature of 25° C.

Figure 19:
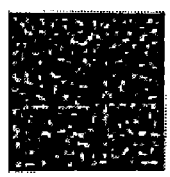
FIG. 19 is an example of ranking showing degrees of beading.
Figure 19:
Figure 19:
Figure 19:

In the present invention, the term "beading" refers to a phenomenon in which ink droplets sprayed on a recording medium cannot be absorbed within the recording medium and remain in the state of liquid on the surface of the recording medium before next droplets are sprayed, the droplets are mixed with other ink sprayed later and as a result, color materials in the ink (colored pigment etc.) partially form a mass and causes uneven print density (see FIG. 19). This phenomenon is, in recent general printers of which contact time is relatively short, i.e. 100 ms or slower, related to ink absorption rate of recording medium. For example, in case where image in green is printed, depending on the absorption rate (transfer rate) of yellow (Y) ink (or cyan (C) ink) that has been sprayed to the recording medium before (C) ink (or (Y) ink) is sprayed thereon, the degree of beading varies.

The transfer rate of the recording ink onto a recording medium, having a coating layer on at least one surface of its support, is 4 ml/m$^2$ to 15 ml/m$^2$ in 100 ms of contact time measured by a dynamic scanning absorptometer, more preferably 6 to 14 ml/m$^2$. When the transfer rate of the ink in 100 ms of contact time is excessively small, the beading tends to generate, and when excessively large, the diameter of the recorded ink dots may be smaller than the intended level.

In addition, the transfer rate of the recording ink onto a recording medium, having a coating layer on at least one surface of its support, is 7 ml/m$^2$ to 20 ml/m$^2$ in 400 ms of contact time measured by a dynamic scanning absorptometer, more preferably 8 to 19 ml/m$^2$. When the transfer rate of the ink in 400 ms of contact time is excessively small, the spur traces tend to remain due to insufficient dryness, and when excessively large, the bleed tends to generate, leading to possible lower image gloss after drying.

The dynamic scanning absorptometer (DSA, Japan TAPPI Journal Vol. 48, May 1994, pp. 88-92, by Kuga Shigenori) is a device that can correctly measure the amount of liquid absorption in a very short time. The dynamic scanning absorptometer can automatically measure the liquid absorption rate by methods such as directly reading liquid absorption rate from transfer of meniscus in capillary, making a sample into a discotic shape and allowing a liquid absorption head scan thereon in a spiral manner, or performing measurement for the required number of spots on one sample sheet while changing the scanning speed according to a previously set pattern. A liquid providing head for the sample paper is connected to capillary via a Teflon (registered trademark) pipe and the position of meniscus in the capillary is automatically read out by an optical sensor. Specifically, a dynamic scanning absorptometer (Type D, K350 series, Kyowa Seiko Co., Ltd.) can be used to measure the transfer rate of pure water or ink. The transfer rates in 100 ms and 400 ms of contact time can be obtained from interpolation of the measured value of transfer rate in contact time which is in the vicinity of each contact time.

—Colorant—

As the colorant, it is preferable to use any of pigment, dye, and coloring particle.

As the coloring particle, water-dispersing polymer particle which includes at least either of pigment or dye as color material is preferably is used.

Here, "includes color material" means either or both of the conditions where color material has been entrapped in the polymer particle and color material has been adhered on the surface of polymer particle. In this case, color material included in the ink of the present invention need not be entrapped or adhered and as long as the effect of the present invention is not damaged, the color material may be dispersed in emulsion. When the color material is insoluble or hardly-soluble in water and can be adhered by the polymer, any material can be used as the color material and depending on the purpose.

Here, "insoluble or hardly-soluble in water" means that the colorant does not solve more than 10 parts by mass to 100 parts by mass of 20° C. water. In addition, "solve" means that separation or settling of the colorant in the surface layer or in the bottom layer of the water solution cannot be confirmed with eyes.

It is preferable that mean particle size per volume of polymer particle containing the coloring material is 0.01 to 0.16 μm.

As the colorant, for example, dye, pigment, and the like such as water soluble dye, oil soluble dye, and disperse dye may be used. From the viewpoint of rich adhesive property and entrapping property, oil soluble dye and disperse dye are preferable, but taking consideration of light resistance, pigment is preferably used.

It must be noted that it is preferable for each of the dye to solve more than 2 g/L in organic solvent, for example, ketone solvent, so that the dye can be effectively impregnated in polymer particle and it is more preferable that 20 to 600 g/L of the dye is solved.

The water soluble dye is dye that is classified as acid dye, direct dye, basic dye, reactive dye, and edible dye and one that has excellent water-resistance and light resistance is used.

The acid dye and edible dye include, for example, C. I. acid yellow 17, 23, 42, 44, 79, and 142; C. I. acid red 1, 8, 13, 14, 18, 26, 27, 35, 37, 42, 52, 82, 87, 89, 92, 97, 106, 111, 114, 115, 134, 186, 249, 254, and 289; C. I. acid blue 9, 29, 45, 92, and 249; C. I. acid black 1, 2, 7, 24, 26, and 94; C. I. food yellow 3 and 4; C. I. food red 7, 9, and 14; C. I. food black 1 and 2.

The direct dye includes, for example, C. I. direct yellow 1, 12, 24, 26, 33, 44, 50, 86, 120, 132, 142, and 144; C. I. direct red 1, 4, 9, 13, 17, 20, 28, 31, 39, 80, 81, 83, 89, 225, and 227; C. I. direct orange 26, 29, 62, and 102; C. I. direct blue 1, 2, 6, 15, 22, 25, 71, 76, 79, 86, 87, 90, 98, 163, 165, 199, and 202; C. I. direct black 19, 22, 32, 38, 51, 56, 71, 74, 75, 77, 154, 168, and 171.

The basic dye includes, for example, C. I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C. I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C. I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; C. I. basic black 2 and 8.

The reactive dye includes, for example, C. I. reactive black 3, 4, 7, 11, 12, and 17; C. I. reactive yellow 1, 5, 11, 13, 14, 20, 21, 22, 25, 40, 47, 51, 55, 65, and 67; C. I. reactive red 1, 14, 17, 25, 26, 32, 37, 44, 46, 55, 60, 66, 74, 79, 96, and 97; C. I. reactive blue 1, 2, 7, 14, 15, 23, 32, 35, 38, 41, 63, 80, and 95.

The pigment may be properly selected depending on the purpose from inorganic pigments and organic pigments.

The inorganic pigment includes, for example, titanium oxide, iron oxide, calcium carbonate, barium sulfate, aluminum hydroxide, barium yellow, cadmium red, chrome yellow, carbon black, and the like. Among them, carbon black is preferable. The carbon black may be those produced by contact methods, furnace methods, thermal methods or other conventional methods.

The organic pigment includes, for example, azo pigment, polycyclic pigment, dye chelate, nitrolic pigment, nitroso pigment, aniline black, and the like. Among them, azo pigment and polycyclic pigment are more preferable. Note that the azo pigment includes, for example, azo lake, insoluble azo pigment, condensed azo pigment, chelate azo pigment, and the like. The polycyclic pigment includes, for example, phthalocyanine pigment, perylene pigment, perynon pigment, anthraquinone pigment, quinacridone pigment, dioxadine pigment, indigo pigment, thioindigo pigment, isoindolinone pigment, quinofuranone pigment and the like. The dye chelate includes, for example, basic dye chelate, acidic dye chelate, and the like.

Color of the pigment may be properly selected depending on the purpose; for example, black or color pigments can be used. The pigments can be used alone or in combination.

The pigment for black includes, for example, carbon black such as furnace black, lamp black, acetylene black, channel black (C. I. Pigment black 7), metals such as copper, iron (C. I. Pigment black 11), titanium oxide, organic pigment such as aniline black (C. I. Pigment black 1) and the like.

The pigment for color includes, for yellow, for example, C. I. Pigment color 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153 and the like.

The pigment for magenta includes, for example, C. I. Pigment red 1, 2, 3, 5, 17, 22 (brilliant first scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (reddish brown), 104, 105, 106, 108 (cadmium red), 112, 114, 122 (dimethyl quinacridone), 123, 146, 149, 166, 168, 170, 172, 177, 178, 179, 185, 190, 193, 209, and 219 and the like.

The pigment for cyan includes, for example, C. I. Pigment blue 1, 2, 15 (copper phthalocyanine blue R), 15:1, 15:2, 15:3 (phthalocyanine blue R), 15:4, 15:6 (phthalocyanine blue E), 16, 17:1, 56, 60, and 63 and the like.

In addition, additive color for red, green and blue includes C. I. pigment red 177, 194, 224, C. I. pigment orange 43, C. I. pigment violet 3, 19, 23, 37, C. I. pigment green 7 and 36 and the like.

As the pigment, self-dispersing pigment in which at least one kind of hydrophilic group can stably disperse without using dispersant that has been directly, or through other atomic group, combined. As a result, dispersant for dispersing pigment in the conventional ink becomes unnecessary. Pigment having ionicity is preferred as the self-dispersing pigment and anionically charged or cationically charged pigments are most suitable.

It is preferable that mean particle size per volume of the self-dispersing pigment is 0.01 to 0.16 μm in ink.

The anionic hydrophilic group includes, for example, —COOM, —SO$_3$M, —PO$_3$HM, —PO$_3$M$_2$, —SO$_2$NH$_2$, —SO$_2$NHCOR and the like (note that M in the equation represents hydrogen atom, alkali metal, or organic ammonium and R represents alkyl, phenyl which may include a substituent, or naphtyl which may include a substituent). Among them, it is preferable to use one in which —COOM and —SO$_3$M are combined on the surface of color pigment.

"M" in the hydrophilic group as alkali metal includes, for example, lithium, natrium, kalium, and the like. As the organic ammonium, for example, mono or trimethanol ammonium, mono or triethyl ammonium, mono or trimethanol ammonium, and the like. Methods for obtaining the anionically charged color pigment includes, as a method to introduce —COONa on the surface of color pigment, for example, a method to perform oxidization treatment of color pigment using sodium hypochlorite, a method using sulfonation, a method to cause diazonium salt reacted, and the like.

The cationic hydrophilic group includes, for example, quaternary ammonium group as preferable one and quaternary ammonium group shown below is more preferable. The cationic hydrophilic group containing either of the two is preferable as color material.

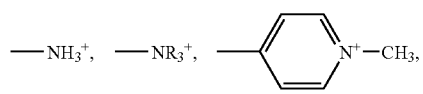

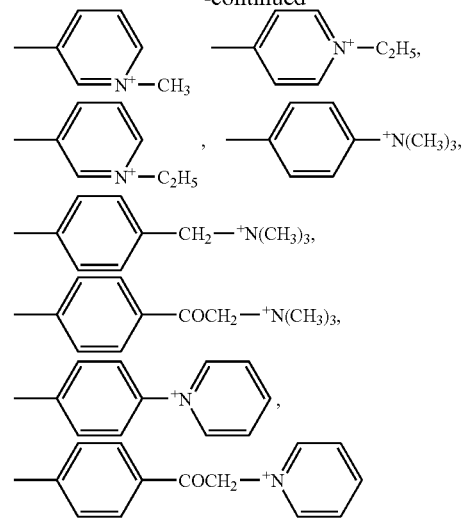

There is no limitation to the method of manufacturing cationic self-dispersing carbon black in which the hydrophilic group has been combined and therefore any method can be selected depending on the purpose. For example, a method to process carbon black by 3-amino-N-ethylpyridinium bromide can be listed as the method to combine N-ethylpyridyl shown below.

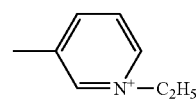

The hydrophilic group may be combined on the surface of the carbon black through other group of atoms. As the other group of atoms, for example, alkyl having 1 to 12 carbon atom, phenyl that may have substituent, and naphthyl that may have substituent can be listed. As a specific example of hydrophilic group combined on the surface of carbon black through other group of atoms, —C$_2$H$_4$COOM (here M represents alkali metal or quaternary ammonium), -PhSO$_3$M (here Ph represents phenyl and M represents alkali metal or quaternary ammonium), —C$_5$H$_{10}$NH$_3^+$ and the like can be listed.

In the present invention, pigment dispersing liquid using pigment dispersant may be used.

For the pigment dispersant, as hydrophilic high molecular compound, vegetal polymer such as gum arabic, gum tragan, guar gum, karaya gum, locust bean gum, arabinogalacton, pectin, and queen's seed starch, sea weed polymer such as alginic acid, carrageenen, and agar, animal polymer such as gelatin, casein, albumen, and collagen, microorganism polymer such as xanthene gum and dextran can be listed as natural material. As semisynthetic material, cellulose polymer such as methyl cellulose, ethyl cellulose, hydroxyethyl cellulose, hydroxypropyl cellulose, and carboxymethyl cellulose, starch polymer such as sodium carboxymethyl starch and sodium ester phosphate starch, sea weed polymer such as sodium alginate and propylene glycol ester alginate can be listed. As synthetic material, vinyl polymer such as polyvinyl alcohol, polyvinyl pyrrolidone, and polyvinyl methyl ether, acrylic polymer such as nonbridging polyacrylamide, polyacrylic acid or alkali metal salt thereof, and soluble styrene acrylic resin, and natural polymer such as soluble styrene maleic acid resin, soluble vinyl naphthalene acrylic resin, soluble vinyl naphthalene malein acid resin, polyvinyl oyrolidone, alkali metal salt of β-naphthalenesulfonic formaldehyde condensation, polymer compound having salt of cationic function such as quaternary ammonium or amino in the side chain thereof, natural polymer compound such as shellac, or the like can be listed. Among them, co-polymer compound having carboxyl group made by copolymerizing acrylic acid, metacrylic acid, or acrylic resin made by polymerizing ester thereof; acrylic acid, metacrylicacid, or styrene, and other monomer having hydrophilic group is especially preferable.

It is preferable that mass average molecular weight of the copolymer is between 3,000 and 50,000, more preferably between 5,000 and 30,000. Furthermore, it is more preferable that set the mass average molecular weight is between 7,000 and 15,000.

It is preferable that mass ratio of the pigment and the dispersant in the mixture (pigment:dispersant) is 1:0.06 to 1:3, more preferably 1:0.125 to 1:3.

It is preferable that the amount of the colorant is 6 to 15% by mass in the ink, more preferably 8 to 12% by mass. When the amount added is 6% by mass or smaller, image density may be deteriorated due to lowered tinting strength or feathering or blur may be increased due to lowered viscosity. When the amount added is 15% by mass or larger, a nozzle of inkjet recording apparatus may become prone to drying, causing error in discharging ink, lowered permeability due to high viscosity, lowered image density or blurred image due to limited spreading of a dot.

—Humectant—

The humectant is not limited and any agent can be selected depending on the purpose. For example, at least one from polyol compound, lactam compound, urea compound, and saccharide is preferable as the humectant.

The polyol compound includes, for example, heavy alcohol, heavy alcohol alkylether, heavy alcohol arylether, amides, amines, sulfur containing compounds, propylene carbonate, ethylene carbonate, and the like. They may be used independently or more than two of them may be simultaneously used.

The heavy alcohol may include, for example, ethylene glycol, diethylene glycol, triethylene glycol, polyethylene glycol, polypropylene glycol, 1,3-propanediol, 1,3-butanediol, 1,4-buthanediol, 3-methyl-1,3-butanediol, 1,3-propanediol, 1,5pentanediol, 1,6-hexanediol, glycerol, 1,2,6-hexanetriol, 1,2,4-butanetriol, 1,2,3-butanetriol, petriol and the like.

The heavy alcohol alkylether may include, for example, ethyleneglycol monoethylether, ethyleneglycol monobutyl ether, diethyleneglycol monomethyl ether, diethyleneglycol monoethyl ether, diethylyneglycol monobutyl ether, tetraethyleneglycol monomethyl ether, propylene glycol monoethyl ether, and the like.

The heavy alcohol arylether may include, for example, ethylene glycol monophenyl ether, ethylene glycol monobenzil ether, and the like.

The nitrogen heterocyclic compound may include, for example, N-methyl-2-pyrrolidone, N-hydroxyethyl-2-pyrrolidone, 2-pyrrolidone, 1,3-dimethylimidazolidinone, ε-caprolactam and the like.

The amides may include, for example, formamide, N-methyl formamide, N,N-dimethylformamide, and the like.

The amines may include, for example, monoethanolamine, diethanolamine, triethanolamine, monoethylamine, diethylamine, triethylamine and the like.

The sulfur containing compounds may include, for example, dimethyl sulfoxide, sulfolane, thiodiethanol and the like.

The lactam compound may be at least one of compounds selected from, for example, 2-pyrrolidone, N-methy-2-pyrrolidone, N-hydroxyethyl-2-pyrrolidone, and ε-caprolactam.

The urea compounds may be at least one of compounds selected from, for example, urea, thiourea, ethyleneurea, and 1,3-dimethyl-2-imidazolidinone. It is preferable that the amount of the urea compounds in the ink is 0.5 to 50% by mass, more preferably 1 to 20% by mass.

The saccharide may include, for example, monosaccharide, disaccharide, oligosaccharide (including trisaccharide and tetrasaccharide), polysaccharide, and derivatives of these saccharides. Among these, glucose, mannose, fructose, ribose, xylose, arabinose, galactose, maltose, cellobiose, lactose, sucrose, trehalose, and maltotriose are preferable and maltitose, sorbitose, gluconolactone, and maltose are especially favorable.

The polysaccharide means sugar in a broad sense and may be used to mean substance including α-cyclodextrin, cellose, and the like which widely exist in the natural world.

The derivatives of the saccharide may include, for example, reducing sugar of the saccharide (for example, sugar alcohol, which is expressed by equation $HOCH_2(CHOH)_nCH_2OH$ (where n represents any of integers 2 to 5), oxidized sugar (for example, aldonic acid, uronic acid, and the like), amino acid, thio acid and the like. Among them sugar alcohol is preferable. The sugar alcohol may include, for example, maltitol, sorbit, and the like.

Of the above, glycerin, ethylene glycol, diethylene glycol, triethylene glycol, propylene glycol, dipropylene glycol, tripropylene 2,3-butanediol, 1,4-butanediol, 3-methyl-1,3-butanediol, 1,3-propanediol, 1,5-pentanediol, tetraethylene glycol, 1,6-hexandiol, 2-methyl-2,4-pentanediol, polyethylene glycol, 1,2,4-butantriol, 1,2,6-hexanetriol, thiodiglycol, 2-pyrrolidone, N-methyl-2-pyrrolidone, N-hydrozyethyl-2-pyrrolidone are preferable and glycerin, 3-methyl-1,3-butanediol, and 2-pyrrolidone are especially preferable because superior effect in solubility and prevention of error in spraying due to evaporation of water contained can be expected.

It is preferable that the amount of the humectant contained in the ink is 10 to 50% by mass, more preferably 20 to 30% by mass. When the amount contained is too small, a nozzle may become easy to dry, causing error in discharging ink droplet. When the amount contained is too much, viscosity of ink becomes high, exceeding appropriate viscosity range.

—Wetting Agent—

As the wetting agent, soluble organic solvent such as polyol compound or glycol ether compound is used and especially, either polyol compound of which carbon number is 8 or more or glycol ether compound is preferably used.

When the carbon number of the polyol compound is smaller than 8, sufficient permeability cannot be obtained, recording medium may get dirty, and/or ink does not spread sufficiently on recording medium and each of pixels is not clearly printed, which may lead to deterioration of quality of letter or image density.

As the polyol compound having 8 or more carbon number, for example, 2-ethyl-1,3-hexanediol (solubility: 4.2% (25° C.)), 2,2,4-trimethyl-1,3-pentanediol (solubility: 2.0% (25° C.)) or the like is preferable.

The glycol ether compound is not especially limited and can be selected freely depending on the purpose. The compound may include, for example, heavy alcohol alkyl ether such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, heavy alcohol aryl ether such as ethylene glycol monophenyl ether, ethylene glycol monobenzil ether, and the like.

The amount of the wetting agent to be added is not especially limited and can be freely determined depending on the purpose. Still, it is preferable to set the amount to be 0.1 to 20% by mass and is more preferable to set it to be 0.5 to 10% by mass.

—Surfactant—

The surfactant may be properly selected depending on the application; examples thereof include anionic surfactants, nonionic surfactants, amphoteric surfactants and fluorine-containing surfactants.

The anionic surfactant includes, for example, acetate of polyoxyethylene alkyl ether, dodecylbenzene sulfonate, lauryl acid chloride, polyoxyethylene alkyl ether sulfonate, and the like.

The nonionic surfactant includes, for example, acetylene glycol surfactant, polyoxyethylene alkyl ether, polyoxyethylene alkyl phenyl ether, polyoxyethylene alkyl ester, polyoxyethylene sorbitan fatty acid ester, and the like.

The acetylene glycol surfactant includes, for example, 2,4,7,9-tetramethyl-5-desine-4,7-diol, 3,6-dimethyl-4-octyne-3,6-diol, 3,5-dimethyl-1-hexyne-3-diol and the like. Commercial products such as Surfynol 104, 82, 465, 485, TG, of Air Products and Chemicals Inc. (U.S.A.) and the like are also included in the acetylene glycol surfactant.

The amphoteric surfactant includes, for example, laurylamino propionate, lauryldimethyl betaine, lauryldihydroxyethyl betaine and the like. More specifically, lauryldimethyl aminoxide, miristyl dimethyl aminoxide, stearyldimethyl aminoxide, dihydroxyethyl lauryl aminoxide, porioxyethylene palm oil alkyl dimethyl aminoxide, dimethyl alkyl(palm) betaine, dimethyl lauryl betaine, and the like.

Among these surfactants, surfactants expressed by the following general formulas (I) to (VI) are preferable.

$$R^1-O-(CH_2CH_2O)_hCH_2COOM \qquad \text{General formula (I)}$$

where $R^1$ represents alkyl, which has carbon number of 6 to 14 and may branch, h represents any integer from 3 to 12, M represents either one selected from alkali metal ions, quaternary ammoniums, quaternary phosphoniums, and alkanolamines.

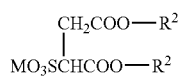

General formula (II)

where $R^2$ represents alkyl, which has carbon number of 5 to 16 and may branch, M represents either one selected from alkali metal ions, quaternary ammoniums, quaternary phosphoniums, and alkanolamines.

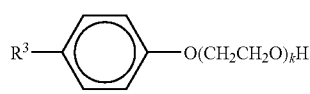

General formula (III)

where $R^3$ represents hydrocarbon radical and which represents, for example, alkyl having carbon number of 6 to 14 that may branch, and k represents an integer from 5 to 20.

$$R^4-(OCH_2CH_2)_jOH: \qquad \text{General formula (IV)}$$

where $R^4$ represents hydrocarbon radical and which represents, for example, alkyl having carbon number of 6 to 14 that may branch, and j represents an integer from 5 to 20.

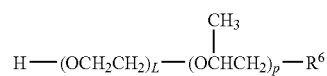

General formula (V)

where $R^6$ represents hydrocarbon radical and which represents, for example, alkyl having carbon number of 6 to 14 that may branch, and L and p represent integers from 1 to 20, respectively.

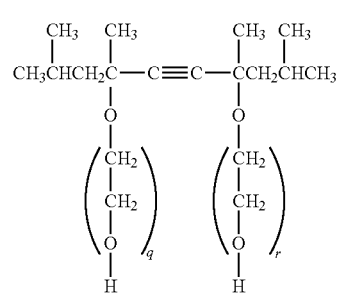

General formula (VI)

where q and r represent integers from 0 to 40, respectively, in the general formula (VI).

The surfactant of the structure formula (I) and (II) are specifically shown in the form of free acid.

$$CH_3(CH_2)_{12}O(CH_2CH_2O)_3CH_2COOH \qquad (1\text{-}1):$$

$$CH_3(CH_2)_{12}O(CH_2CH_2O)_4CH_2COOH \qquad (1\text{-}2):$$

$$CH_3(CH_2)_{12}O(CH_2CH_2O)_5CH_2COOH \qquad (1\text{-}3):$$

$$CH_3(CH_2)_{12}O(CH_2CH_2O)_6CH_2COOH \qquad (1\text{-}4):$$

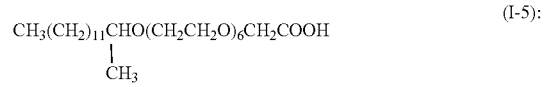

(I-5):

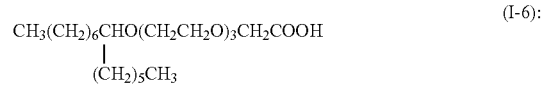

(I-6):

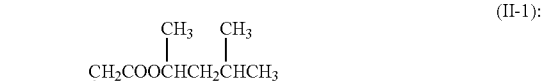

(II-1):

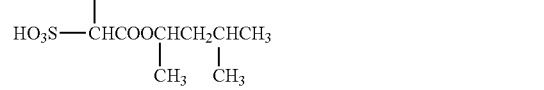

(II-2):

-continued

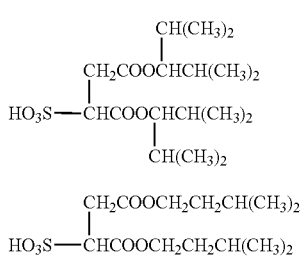

As the fluochemical surfactant, one expressed by the following general formula (A) is preferable.

$$CF_3CF_2(CF_2CF_2)_m—CH_2CH_2O(CH_2CH_2O)_nH: \text{General formula (A)}$$

where m represents an integer of 0 to 10, and n represents an integer of 1 to 40 in the general formula (A).

The fluorine-containing surfactant may include, for example, perfluoroalkyl sulfonic acid compound, perfluoroalkyl carboxyl compound, perfluoroalkyl ester phosphate compound, perfluoroalkyl ethyleneoxide adduct, polyoxyalkylene ether polymer compound having perfluoroalkyl ether group in the side-chain, and the like. Among them, as polyoxyalkylene ether polymer compound having perfluoroalkyl ether group in the side-chain has low foaming property and is safer because it has low bioaccumulation potential of fluochemical, which has recently been viewed as a problem, it is preferable for use.

The perfluoroalkyl sulfonic acid compound includes, for example, perfluoroalkyl sulfonic acid, perfluoroalkyl sulfonate, and the like.

The perfluoroalkyl carboxyl compound includes, for example, perfluoroalkyl carboxylic acid, perfluoroalkyl carboxylate, and the like.

The perfluoroalkyl ester phosphate compound includes, for example, perfluoroalkyl ester phosphate, salt of perfluoroalkyl ester phosphate, and the like.

The polyoxyalkylene ether polymer compound having perfluoroalkyl ether group in the side-chain includes polyoxyalkylene ether polymer having perfluoroalkyl ether group in the side-chain, polyoxyalkylene ether polymer having perfluoroalkyl ether group in the side-chain sulfate ester salt, salt of polyoxyalkylene ether polymer having perfluoroalkyl ether group in the side-chain, and the like.

Counter ion of salt in the fluochemical surfactant includes Li, Na, K, $NH_4$, $Nh_3CH_2CH_2OH$, $NH_2(CH_2CH_2OH)_2$, $NH(CH_2CH_2OH)_3$, and the like.

The fluochemical surfactant may be synthesized as needed. Commercially available agent may also be used.

The commercially available surfactants include Sarfron S-111, S-112, S-113, S-121, S-131, S-132, S-141, S-145 (all of which are products of Asahi Glass Co., Ltd), Flulard FC-93, FC-95, FC-98, FC-129, FC-135, FC-170C, FC-430, FC-431 (all of which are products of Sumitomo 3M), MEGAFACE F-470, F1405, and F-474 (all of which are products of Dainippon Ink and Chemicals Incorporated), Zonyl TBS, FSP, FSA, FSN-100, FSO, FS-300, and UR (all of which are products of Du Pont Co.), FT-110, FT-250, FT-251, FT-400S, FT-150, FT-400SW (all of which are products of NEOS Company Limited), PF-151N (product of OMNOVA Solutions Inc.) and the like. Among them, Zonyl FS-300, FSN, FSN-100, and FSO (products of Du Pont) are especially preferable for use.

—Other Ingredients—

The other ingredients may be properly selected as required. For example, resin emulsion, aminopropanediol compound, pH adjuster, preservative and fungicide, corrosion inhibitor, antioxidant, ultraviolet absorber, oxygen absorber, light stabilizer, or the like can be included.

—Resin Emulsion—

In the resin emulsion, resin particles are dispersed in water as continuous phase. The resin emulsion may include dispersant such as surfactant, depending on the necessity.

It is preferable that the amount of resin particles included as the dispersed phase (amount of resin particle included in resin emulsion) is 10 to 70% by mass in general. Moreover, it is preferable that particle size of the resin particle is 10 to 1000 nm and more preferably 20 to 300 nm, taking consideration of the fact that it is used for an inkjet recording apparatus.

The component of the resin particle of the dispersed phase may be properly selected depending on the purpose. For example, acrylic resin, vinyl acetate resin, styrene resin, butadiene resin, styrene-butadiene resin, vinyl chloride resin, acryl styrene resin, acryl silicone resin or the like can be selected and among them, acryl silicone resin is especially preferable for use.

As the resin emulsion, appropriately synthesized one or commercially available one may be used.

The commercially available resin emulsion may include, for example, Micro Gel E-1002 and E-5002 (styrene-acrylic resin emulsion, product of Nippon Paint Co., Ltd.), Bon Coat 4001 (acrylic resin emulsion, product of Dainippon Ink and Chemicals Incorporated), Bon Coat 5454 (styrene-acrylic resin emulsion, product of Dainippon Ink and Chemicals Incorporated), SAE-1014 (styrene-acrylic resin emulsion, product of ZEON Corporation), Saivinol SK-200 (acrylic resin emulsion, product of Saiden Chemical Industry), Primal AC-22 and AC-61 (acrylic resin emulsion, product of Rohm and Haas), Nanocryl SBCX-2821 and 3689 (acrylic silicone resin emulsion, product of Toyo Ink Mfg. Co.), No. 3070 (methyl methacrylate copolymer resin emulsion, by Mikuni Color Ltd.), and the like.

It is preferable that the amount of resin particle of the resin emulsion in the ink is 0.1 to 50% by mass, more preferably 0.5 to 20% by mass, and is further more preferably 1 to 10% by mass. When the added amount is smaller than 0.1% by mass, sufficient improvement of clogging and stable discharging of ink cannot be obtained and when the added amount exceeds 50% by mass, it may decrease preservation stability of the ink.

The aminopropanediol compound is soluble organic basic compound and aminopropanediol derivative is suitable, for example.

The aminopropanediol derivative includes, for example, 1-amino-2,3-propanediol, 1-methylamino-2,3propanediol, 2-amino-2-methyl-1,3-propanediol, 2-amino-2-ethyl-1,3propanediol, and the like but not limited to them and can be selected freely depending on the purpose. Among them, 2-amino-2-ethyl-1,3propanediol is especially preferable.

It is preferable that amount of the aminopropanediol derivative in the recording ink is 0.01 to 10% by mass, more preferably 0.1 to 5.0% by mass, and yet more preferably 0.1 to 2.0% by mass. When too much amount of aminopropanediol is added, problems such as high pH and increased viscosity of ink may occur.

The preservative and fungicide may include, for example, 1,2-benzisothiazoline-3-one, sodium dehydroacetate, sodium sorbate, 2-pyridinethiol-1-sodium oxide, sodium benzoate, sodium pentachlorophenol, or the like.

The pH adjuster may be properly selected depending on the purpose, as long as the pH can be adjusted to 7 or more.

The pH adjuster includes, for example, amine such as diethanol amine and triethanol amine, hydroxide of alkali metal element such as lithium hydroxide, sodium hydroxide, and potassium hydroxide, carbonate of alkali metal such as ammonium hydroxide, quaternary ammonium hydroxide, quaternary phosphonium hydroxide, lithium carbonate, potassium carbonate, or the like.

The corrosion inhibitor may include, for example, acidic sulfate salt, thiosodium sulfate, ammonium thiodiglycolate, diisopropyl ammoniumnitrite, pentaerythritol tetranitrate, dicyclohexyl ammoniumnitrite, or the like.

The antioxidant may include, for example, phenol antioxidant (including hindered phenol antioxidant), amine antioxidant, sulfur antioxidant, phosphorous antioxidant, or the like.

The phenol antioxidant may include, for example, butylated hydroxyanisol, 2,6-di-tert-butyl-4-ethylphenol, stearyl-6-(3,5-di-tert-butyl-4-hydroxyphenyl)propionate, 2,2'-methylenebis(4-methyl-6-tert-butylphenyl), 2,2'-methylenebis(4-ethyl-6-tert-butylphenyl), 4,4'-butylidenebis(3-methyl-6-tert-butylphenol), 3,9-bis[1,1-dimethyl-2-[6-(3-tert-butyl-4-hydroxy-5-methylphenyl)propionyloxy]ethyl]2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzil)benzene, tetrakis[methylene-3-(3',5'-di-tert-butyl-4'hydroxyphenyl)propinate]methane, or the like.

The amine antioxidant may include, for example, phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenebis(3-methyl-6-tert-butylphenol), 4,4thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane, or the like.

The sulfur antioxidant may include, for example, dilauryl3, 3'-thiopropionate, distearylthiodipropionate, laurylstearylthiopropionate, dimyristyl3,3'-thiopropionate, distearylβ,β'-thiodipropionate, 2-mercaptobenzimidazol, dilaurylsulfide, or the like.

The phosphorous antioxidant may include triphenyl phosphite, octadecyl phosphite, trilauryl trithio phosphite, trinonylphenyl phosphite, or the like.

The ultraviolet absorber may include, for example, benzophenone ultraviolet absorber, bensotriasol ultraviolet absorber, salicylate ultraviolet absorber, cyanoacrylate ultraviolet absorber, nickel complex ultraviolet absorber, or the like.

The benzophenone ultraviolet absorber may include, for example, 2-hydroxy-4-n-octoxybenzophenone, 2-hydroxy-4-n-dodecyloxybenzophenone, 2,4-dihydroxybenzophenone, 2-hydroxy-4-methoxybenzophenone, 2,2',4,4'-tetrahydroxybenzophenone, or the like.

The bensotriasol ultraviolet absorber may include, for example, 2-(2'-hydroxy-5'-tert-octylphenyl)bensotriasol, 2-(2'-hydroxy-5'-methylphenyl)bensotriasol, 2-(2'-hydroxy-4'octoxyphenyl) bensotriasol, 2-(2'-hydroxy-3'tert-butyl-5'-methylphenyl)-5-chlorobensotriasol, or the like.

The salicylate ultraviolet absorber may include, for example, phenyl salicylate, p-tert-butylphenyl salicylate, p-octylphenyl salicynate, or the like.

The cyanoacrylate ultraviolet absorber may include, for example, methyl-2-cyano-3,3'-diphenylacrylate, methyl-2-cyano-3-methyl-3-(p-methoxyphenyl)acrylate, butyl-2-cyano-3-methyl-3(p-methoxyphenyl)acrylate, or the like.

The nickel complex ultraviolet absorber may include, for example, nickelbis(octylphenyl)sulfide, 2,2'-thiobis(4-tert-octylferrate)-n-butylamine nickel(II), 2,2'-thiobis(4-tert-octylferrate)-2-ethylhexylamine 2,2'-thiobis(4-tert-octylferrate)triethanolamine nickel(II), or the like.

Ink of ink-media set of the present invention is manufactured by dispersing or solving at least water, colorant, and humectant and, depending on the necessity, wetting agent, surfactant, and depending on more necessity, other components in aqueous vehicle and thereafter, depending on necessity, stirring and mixing them. The dispersion processing can be, for example, performed by using a sand mill, homogenizer, ball mill, paint shaker, or ultrasonic disperser, and stirring and mixing processing can be performed by use of a stirring machine having commonly-used wings, magnetic stirrer, high-speed disperser, or the like.

The viscosity of the ink is preferably 2 mPa·s or more at 25° C. In consideration of image quality such as character quality when recorded on regular paper, the viscosity of the ink is preferably 5 mPa·s or more, and more preferably 8 mPa·s to 20 mPa·s. When the viscosity exceeds 20 mPa·s, it may become difficult to ensure stability in discharging ink. The pH of the ink is preferably 7 to 10.

Color of the ink is not especially limited and depending on the purpose, any color can be selected. For example, yellow, magenta, cyan, and black can be used. When an ink set which uses two or more of these colors is used to record, multi-colored image can be formed, and when an ink set using all of these colors is used, full color image can be formed.

(Recording Medium)

The recording medium according to the present invention comprises a support and a coating layer on at least one surface of its support, and other optional layers as required.

In the recording medium, it is preferable that the transfer rate of pure water onto the recording medium measured by a dynamic scanning absorptometer in 100 ms of contact time is preferably 2 ml/m$^2$ to 26 ml/m$^2$, more preferably 4 ml/m$^2$ to 26 ml/m$^2$, and still more preferably 8 ml/m$^2$ to 25 ml/m$^2$.

When transfer rate of the ink or pure water in 100 ms of contact time is too small, beading becomes prone to occur and when the transfer rate is too large, diameter of ink dot after recording may become smaller than desired one.

It is preferable that the transfer rate of the pure water to the recording medium measured by a dynamic scanning absorptometer in 400 ms of contact time is 3 ml/m$^2$ to 29 ml/m$^2$, and that transfer rate is more preferably 10 ml/m$^2$ to 28 ml/m$^2$.

When the transfer rate in 400 ms of contact time is too small, due to insufficient drying, spur mark becomes prone to occur and when the transfer rate is to large, bleed becomes prone to occur, leading to decreased gloss in the image after drying.

The dynamic scanning absorptometer (DSA, Japan TAPPI Journal Vol. 48, May 1994, pp. 88-92, by Kuga Shigenori) is a device that can correctly measure the amount of liquid absorption in a very short time. The dynamic scanning absorptometer can automatically measure the liquid absorption rate by methods such as directly reading liquid absorption rate from transfer of meniscus in capillary, making a sample into a discotic shape and allowing a liquid absorption head scan thereon in a spiral manner, or performing measurement for the required number of spots on one sample sheet while changing the scanning speed according to a previously set pattern. A liquid providing head for the sample paper is connected to capillary via a Teflon (registered trademark) pipe and the position of meniscus in the capillary is automatically read out by an optical sensor. Specifically, a dynamic scanning absorptometer (Type D, K350 series, Kyowa Seiko Co., Ltd.) can be used to measure the transfer rate of pure water or ink. The transfer rates in 100 ms and 400 ms of contact time can be obtained from interpolation of the measured value of transfer rate in contact time which is in the vicinity of each contact time.

—Support—

Examples of the support include papers based on wood fibers, sheet-like materials such as nonwoven fabrics based on wood fibers or synthetic fibers, or the like.

The paper may be properly selected depending on the purpose; for example, wooden pulp and recycled pulp can be used. As the wooden pulp, hardwood bleached Kraft pulp (LBKP), softwood bleached Kraft pulp (NBKP), NBSP, LBSP, GP, TMP, and the like can be used.

The raw material of the recycled pulp includes high-quality white paper, white paper with blue line, cream-colored paper, card, medium-quality white paper, low-quality white paper, printed white paper, Kent paper, white art paper, medium-quality printed white paper, low-quality printed white paper, newspaper, magazine, and the like, which are listed in the list of Quality Standard of Recycled Paper released by the Paper Recycling Promotion Center. Specifically, non-coated computer printout paper, printer sheet such as thermosensitive paper and impact paper; recycled paper from office such as PPC, coated papers such as art paper, coated paper, light weight coated paper, and matt paper; non-coated paper such as high-quality paper, high-quality color paper, notebook, letter paper, fancy paper, medium-quality paper, paper for newspaper, low-quality paper, gift wrapping paper, simili paper, white roll paper, and milk carton and recycled paper of board such as chemical pulp paper and high-yield pulp containing paper. These may be used alone or in combination.

The recycled pulp is typically produced through the following four processes.

(1) Used paper is processed by a machine and chemicals into fibril form and ink used for printing is separated from the fiber.

(2) Contaminated materials (such as plastics) and dusts are removed by a screen, a cleaner and the like.

(3) Ink used for printing that was separated from the fiber by use of surfactant is removed by flotation method or cleansing method.

(4) Bleaching of the fiber is performed using oxidation to enhance whiteness of fibers.

When the recycled pulp is mixed with other pulp, it is preferred that the mixture rate of the recycled pulp is 40% or lower to prevent curling after recording.

Conventional fillers such as white pigments are utilized for an internal filler for the support. Examples of the white pigment include white inorganic pigments such as light calcium carbonate, heavy calcium carbonate, kaolin, clay, talc, calcium sulfate, barium sulfate, titanium dioxide, zinc oxide, zinc sulfide, zinc carbonate, calcium sulfate, aluminum silicate, diatomaceous earth, calcium silicate, magnesium silicate, synthetic silica, aluminum hydroxide, alumina, lithopone, zeolite, magnesium carbonate, magnesium hydroxide; and organic pigments such as styrene plastic pigment, acrylic plastic pigment, polyethylene, microcapsule, urea resin, and melamine resin. These may be used alone or in combination.

Sizing agent used in making the support includes neutral rosin sizing agent used for neutral papermaking, alkenyl succinic anhydride (ASA), alkyl ketene dimer (AKD), and petroleum resin sizing agent. Among them, neutral rosin sizing agent or alkenyl succinic anhydride is especially preferable. The above mentioned alkyl ketene dimer has a significant sizing effect and therefore the amount used is small. However, it tends to lower the friction coefficient of the surface of recording paper (recording medium) and therefore is not preferable from the viewpoint of transportability when inkjet recording is performed.

—Coating Layer—

The coating layer includes a pigment and a binder, and optional ingredients such as a surfactant as required.

The pigment may be an inorganic pigment or a combination of an inorganic pigment and an organic pigment.

Examples of the inorganic pigment includes kaolin, talc, light calcium carbonate, heavy calcium carbonate, calcium sulfite, amorphous silica, calcium sulfate, magnesium carbonate, titanium dioxide, aluminum hydroxide, calcium hydroxide, magnesium hydroxide, zinc hydroxide, and chlorite. Among these, kaolin is especially preferable due to its excellent which allows to make the texture close to that of offset printing media.

The kaolin includes delaminated kaolin, calcinated kaolin, and engineered kaolin made by surface reforming and the like. Taking consideration of the expression of brilliance, it is preferable that more than 50% by mass of the whole kaolin is occupied by kaolin of which 80% by mass or more of particle diameter distribution is particle having diameter smaller than 2 μm.

The amount of the kaolin added is preferably 50 parts by mass or more based on 100 parts by mass of all pigments in the coating layer. When the added amount is less than 50 parts by mass, the brilliance may be insufficient. The upper limit of the added amount is not necessary to define; preferably, it is no more than 90 parts by mass from viewpoint of coating suitability, in particular the fluidity of kaolin under high shearing force.

The organic pigment includes water-soluble dispersion such as styrene-acrylic copolymer particle, styrene-butadiene copolymer particle, polystyrene particle, and polyethylene particle. Two or more of these organic pigments may be mixed.

It is preferable that the added amount of the organic pigment is 2 to 20 parts by mass based on 100 parts by mass of all pigments in the coating layer. Because the organic pigment is excellent in expressing brilliance and its specific density is relatively smaller than inorganic pigment, it is possible to obtain coated layer which is thick and brilliant and has good surface coating property. When the added amount is less than 2 parts by mass, such effects cannot be obtained and when the amount exceeds 20 parts by mass, fluidity of the coating liquid is deteriorated, which leads to lowered coating operation and is therefore not economical.

The organic pigment has various shapes, e.g., dense type, hollow type, and doughnut type. Taking consideration of the balance between expression of brilliance, surface coating property, and fluidity of coating liquid, it is preferable that the average particle size is 0.2 μm to 3.0 μm and it is more preferable to choose hollow type having void ratio of 40% or more.

It is preferable to use water-based resins as the binder.

As the water-based resins, either water-soluble resins or water dispersible resins are preferably used. Examples of the water-soluble resins include polyvinyl alcohol, modified polyvinyl alcohols such as anionic modified polyvinyl alcohol, cationic modified polyvinyl alcohol and acetal modified polyvinyl alcohol; polyurethane; polyvinyl pyrrolidone, copolymer of polyvinylpyrrolidone and vinyl acetate; copolymer of polyvinylpyrrolidone and dimethylaminoethyl metacrylate, copolymer of quarternized polyvinylpyrrolidone and dimethylaminoethyl metacrylate, copolymer of polyvinylpyrrolidone and methacrylamidepropyl trimethylammonium chloride; cellulose such as carboxymethyl cellulose, hydroxyethyl cellulose, hydroxypropyl cellulose; modification of cellulose such as cationized hydroxyethyl cellulose; synthetic resin such as polyester, polyacrylic acid (ester), melamine resin, or modification of these substances and copolymer of polyester and polyurethane; polyacrylic (methacrylic) acid, polyacrylamide (methacrylamide), oxidized starch, phosphoric acid esterified starch, self-modified starch, cationized starch, or other various modified starch, polyethyleneoxide, sodium polyacrylate, and sodium alginate. These substances may be used alone or in combination. Among these, polyvinyl alcohol, cationic modified polyvinyl, acetal modified polyvinyl alcohol, polyester, polyurethane, and copolymer of polyester and polyurethane are especially preferable from the viewpoint of ink absorption property.

The water-dispersible resin may be properly selected depending on the purpose; examples thereof include polyvinyl acetate, copolymer of ethylene-vinyl acetate, polystyrene, copolymer of styrene-(meth)acrylate, copolymer of (meth)acrylate, copolymer of vinyl acetate-(meth)acrylate, copolymer of styrene-butadiene, copolymer of ethyrene-propylene, polyvinylether, copolymer of silicone-acrylate etc. Moreover, the water dispersible resin may include a cross-linking agent such as methylolized melamine, methylolized urea, methylolized hydroxypropyleneurea, isocyanate, or the like and may be copolymer having self-cross-linking ability that includes N-methylolacrylamide or other unit. Plural water-based resins may be used simultaneously.

The amount of water-based resin to be added is preferably 2 parts by mass to 100 parts by mass based on 100 parts by mass of the pigment, more preferably 3 parts by mass to 50 parts by mass. The amount of water-based resin is determined so that liquid absorption characteristics of the recoding medium are within a desired range.

When the water dispersible colorant is used as the colorant, cationic organic compounds are utilized as required. For example, direct dye in water-based ink, sulfonate acid group in acid dye, primary to tertiary amine that forms insoluble salt when reacted with carboxyl group, amino group, or the like, monomer, oligomer, and polymer of quaternary ammonium salt can be used; among these, oligomers or polymers are preferable.

The cationic organic compound may include, for example, dimethylamine epichlorohydrin polycondensation, dimethylamine ammonium epichlorohydrin condensation, poly(trimethylaminoethyl methacrylate/methyl sulfate), diallylamine hydrochloride, acrylamide copolymer, poly(diallylamine hydrochloride/sulfur dioxide), diallylamine hydrochloride, poly(allylamine hydrochloride/diallylamine hydrochloride), acrylicamide/diallylamine copolymer, polyvinylamine copolymer, dicyandiamide, dicyandiamide/ammonium chloride/urea/formaldehyde condensation, polyalkylenepolyamine/dicyandiamideammonium condensation, dimethyldiallylammoniumchloride, polydiallylmethylamine hydrochloride, poly(diallyldimethylammoniumchloride), poly(diallyldimethylammoniumchloride/sulfur dioxide), poly(diallyldimethylammoniumchloride/diallylamine hydrochloride derivative), acrylamide/diallyldimethylammoniumchloride compound, acrylate/acrylamide/diallylamine hydrochloride compound, polyethyleneimine, ethyleneimine derivatives such as acrylamine polymer, polyethyleneiminealkyleneoxide modification and the like. These substances may be used independently and a plurality thereof may also be used simultaneously.

Among these substances, it is preferable to combine cationic organic compounds having lower molecular weights such as dimethylamine epichlorohydrin polycondensation, polyallylamine hydrochloride, and the like with other cationic organic compounds having higher molecular weights, such as polydiallyldimethylammonium chloride and the like. Combination of these substances may make possible to improve image density and to further reduce feathering.

Preferable equivalent weight of cation in the cationic organic compound measured by colloid titration method (using potassium polyvinylsulfate and toluidine blue) is 3 to 8 meq/g. When the equivalent weight of cation is in this range, favorable result can be obtained within the range of the adhesion after drying.

Here, when measuring equivalent weight of cation by colloid titration method, the cationic organic compound is diluted to 0.1% by mass in solid content using distilled water and pH controlling is not performed.

It is preferable that adhesion of the cationic organic compound after drying is in a range between 0.3 to 2.0 $g/m^2$. When the adhesion of the cationic organic compound after drying is less than 0.3 $g/m^2$, sufficient improvement of image density or reduction of feathering may not be obtained.

The surfactant may include anionic surfactant, cationic surfactant, amphoteric surfactant, and nonionic surfactant, but not limited to them. Among them, nonionic surfactants are preferable. Adding the surfactant enables improvement of water-resisting property of image, increased image density, and improvement of bleeding.

The nonionic surfactant includes, for example, fatty alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty ethylene oxide adduct, polypropylene glycol ethylene oxide adduct, fatty acid ester of glycerol, fatty acid ester of pentaerythritol, fatty acid ester of sorbitol or sorbitan, fatty acid ester of simple sugar, alkyl ether of fatty alcohol, fatty amide of alkanolamine, and the like. These substances may be used independently or two or more substances can be used simultaneously.

The fatty alcohol includes, for example, glycerol, trimethylolpropane, pentaerythrite, sorbitol, simple sugar and the like, but not limited to them and any fatty alcohol can be selected for use depending on the purpose. Moreover, with regard to the ethylene oxide adduct, as long as water solubility is maintained, part of ethylene oxide may be substituted with alkylene oxide such as propylene oxide or butylene oxide. It is preferable that less than 50% of the ethylene oxide is substituted. It is preferable that Hydrophile-Lipophile Balance (HLB) of the nonionic surfactant is between 4 and 15 and more preferably, between 7 and 13.

It is preferable that the amount of the surfactant is 0 to 10 parts by mass based on 100 parts by mass of the cationic organic compound, more preferably 0.1 to 1.0 part by mass.

It is possible to add the other substances as required. Examples of the other substances include additives such as alumina powder, pH adjusters, antiseptic agents and antioxidants.

The method of forming the coating layer may be properly selected depending on the purpose. The coating layer can be formed by impregnating or coating the coating layer liquid on the support. The impregnation or coating method of the coating layer liquid may be properly selected depending on the purpose. For example, it is possible to apply coating by use of a conventional size press, gate roll size press, film transfer size press, blade coater, rod coater, air knife coater, curtain coater, cast coater, or the like. Among them, it is preferable to use a conventional size press, gate roll size press, film transfer size press or the like to impregnate or attach coating layer liquid and to finish the procedure by use of an on-machine coater.

The amount of coating layer liquid to be attached may be properly selected depending on the purpose. It is preferable that the amount is 0.5 to 20 g/m$^2$ in the solid content, more preferably 1 to 15 is g/m$^2$.

Following the impregnation or coating, drying may be performed depending on the necessity. The temperature for drying may be properly selected depending on the purpose; preferably, the temperature is between 100 and 250° C.

Following the coating the layer and drying it, a smoothing process is performed by use of calendar devices. Conventional calendar devices, e.g., a super calendar, soft calendar, gross calendar, compact calendar, matt super calendar, matt calendar and the like can be used as the calendar device. The conditions for calendar, temperature of stiff roll, calendar pressure, number of nips, rolling speed, moisture contained in paper before calendar, or the like are selected depending on the required quality. There are two types of calendar device, off-type device which is independent from a coater, and on-type which is integrated with a coater, both of them can be used. Material of the calendar device includes a metal roll or a metal roll on which surface mirror finish has been processed by hard chrome plating as a stiff roll. An elastic roll includes a resin roll such as urethane resin, epoxy resin, polyamide resin, phenol resin, polyacrylate resin and the like, and a roll manufactured by molding urethane cotton, nylon, asbestos, aramid fiber, and the like. Any of them can be used accordingly. Note that it is also possible to combine a moistening device, electrostatic moistening device, steam moistening device, and the like accordingly to adjust moisture of the coated paper after calendar finish. In case of using a cast coater, smoothing processing is performed simultaneously with coating and drying procedures.

The degree of smoothing processing differs depending on the degree of brilliance required of the recording medium. In case of gloss type, the degree of brilliance is adjusted to be in a range of 10 to 90 when specular gloss is 60°.

Pore size of the coating layer of recording medium of the present invention is preferably 0.5 μm or less. When the pore size is 0.5 μm or less and the colorant is dispersed in the ink used, due to the filter effect of the coating layer and the colorant itself, the colorant remains on the surface of the coating layer, enabling expression of high image density and image brilliance.

The recording medium may form a back layer on the back side of the support and may form another layer between the support and the coating layer or between the support and the back layer. It is also possible to form a protection layer on the coating layer. These layers may be single layers or multiple layers.

The amount of recording medium of the present invention is preferably between 40 and 300 g/m$^2$, and more preferably between 50 and 250 g/m$^2$. When the amount is less than 40 g/m$^2$, the recording medium lacks stiffness and may become prone to cause errors such as jamming in the course of transportation and when the amount exceeds 300 g/m$^2$, the medium may become prone to cause errors because it is so stiff and cannot round curves, causing increased friction resistance which leads to jamming of the recording medium.

The recording medium of the present invention may include, other than inkjet recording medium, commercially available coated paper for offset printing, coated paper for printing gravure, or the like.

(Ink-Media Set)

The ink-media set according to the first embodiment of the present invention combines the recording ink of the present invention and the recording medium of the present invention.

The ink-media set according to a second embodiment of the present invention contains recording inks, and a recording medium, wherein each of the recording inks contains water, a colorant and a humectant and has a surface tension of 20 mN/m to 35 mN/m at 25° C.; the recording medium comprises a support, and a coating layer on at least one surface of its support; the transfer rate of the recording ink onto the recording medium is 4 ml/m$^2$ to 15 ml/m$^2$ in 100 ms of contact time and the transfer rate of the recording ink onto the recording medium is 7 ml/m$^2$ to 20 ml/m$^2$ in 400 ms of contact time measured by a dynamic scanning absorptometer.

The transfer rate of the ink of the present invention onto the recording medium in 100 ms of contact time measured by a dynamic scanning absorptometer is typically 4 ml/m$^2$ to 15 ml/m$^2$, and preferably 6 ml/m$^2$ to 14 ml/m$^2$.

When the transfer rate of pure water to the recording medium in 100 ms of contact time is excessively low, ink beading may easily occur, and when the transfer rate is excessively high, the ink dot diameter of the ink recorded on the recording medium may be excessively smaller than the desired ink dot diameter.

In addition, the transfer rate of the ink of the present invention onto the recording medium in 400 ms of contact time measured by a dynamic scanning absorptometer is typically 7 ml/m$^2$ to 20 ml/m$^2$, and preferably 8 ml/m$^2$ to 19 ml/m$^2$.

When the transfer rate of pure water to the recording medium in 400 ms of contact time is excessively low, ink blur marks may easily occur due to insufficient dry of the ink, and when the transfer rate is excessively high, ink bleed easily occur, and the glossiness of dried imaging parts may be easily lowered.

The transfer rate of liquid onto a recording medium varies depending on the liquid to be used for the liquid absorption test, however, in the case where the liquid is pure water, the transfer rate of pure water onto the recording medium in 100 ms of contact time measured by a dynamic scanning absorptometer is preferably 2 ml/m$^2$ to 26 ml/m$^2$, more preferably 4 ml/m$^2$ to 26 ml/m$^2$, and still more preferably 8 ml/m$^2$ to 25 ml/m$^2$.

When the transfer rate of pure water to the recording medium in 100 ms of contact time is excessively low, ink beading may easily occur, and when the transfer rate is excessively high, the ink dot diameter of the ink recorded on the recording medium may be excessively smaller than the desired ink dot diameter.

In addition, the transfer rate of pure water onto the recording medium in 400 ms of contact time measured by a dynamic scanning absorptometer is preferably 3 ml/m$^2$ to 29 ml/m$^2$, 5 ml/m$^2$ to 29 ml/m$^2$, and still more preferably 10 ml/m$^2$ to 28 ml/m$^2$.

When the transfer rate of pure water to the recording medium in 400 ms of contact time is excessively low, ink blur marks may easily occur due to insufficient dry of the ink, and when the transfer rate is excessively high, ink blur marks may easily occur due to insufficient dry of the ink, and when the transfer rate is excessively high, ink bleed easily occur, and the glossiness of dried imaging parts may be easily lowered.

The recording ink and the recording medium of the present invention are described above in detail.

The ink-media set according to the present invention combines a recording media having a texture similar to that of coat paper for offset printing and a certain liquid-absorbability as well as an ink with a certain surface tension, which can allow high-quality recording of (i) letters with so-called "clear edge", or excellent and glossy recorded images with superior printing quality without blur, feathering and bleed at surround of images, (ii) recorded images with higher optical densities, and (iii) highly uniform images without beading at flat-thick portions.

The recording ink according to the present invention can be used well as an inkjet head with any printer that mounts any of inkjet head such as so-called piezo-type that uses a piezoelectric device as pressure generation unit to apply pressure to ink in ink passage to deform a vibration panel which forms a wall of the ink passage to change capacity of the ink passage and discharge ink droplets (JP-A No. 02-51734), so-called thermal type that uses heat element to heat ink in ink passage to generate bubble (JP-A No. 61-59911), and electrostatic type in which a vibration panel that forms a wall of ink passage and an electrode are disposed to face each other so that the vibration panel can be deformed by static electricity generated between the vibration panel and the electrode, changing capacity of the ink passage and thus allowing ink droplet to be discharged (JP-A No. 06-71882).

As described above, the inventive recording ink, the inventive recording medium, and the inventive ink-media set can be preferably used in various fields and can be preferably used in an image recording apparatus using inkjet recording method (e.g. printer) and especially, for example, preferably used in the following ink cartridge, ink recorded matter, inkjet recording apparatus, and inkjet recording method.

(Ink Cartridge)

The ink cartridge according to the present invention can be provided by containing the recording ink into a container, and can equip other members as required.

The container may be properly selected as to the shape, configuration, size, material etc. depending on the necessity; for example, those having at least an ink bag made of aluminum laminated film, resin film, or the like can be preferably used.

Figure 1:
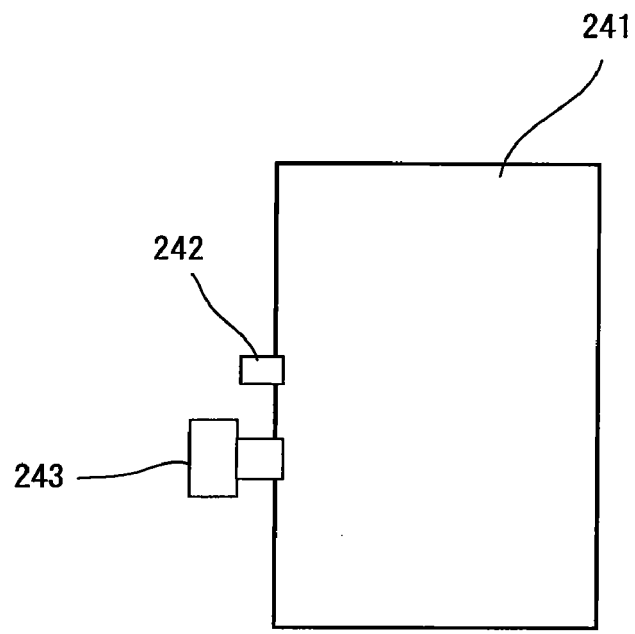
FIG. 1 is a schematic view showing one example of an ink cartridge of the present invention.
Figure 2:
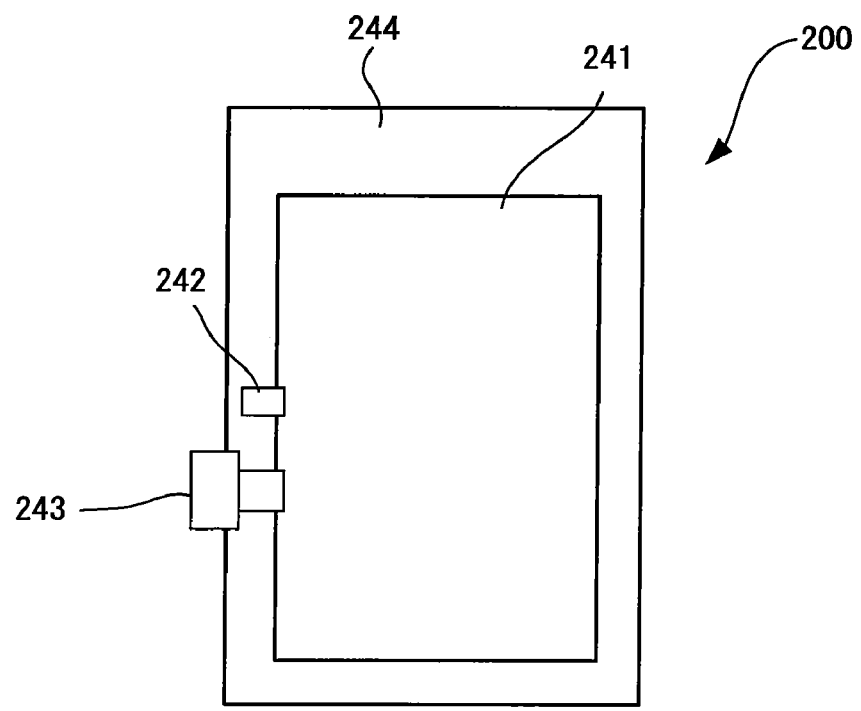
FIG. 2 is a schematic view including a case of the ink cartridge in FIG. 1.

Next, ink cartridge will be described with reference to FIGS. 1 and 2. FIG. 1 is a diagram showing an example of an ink cartridge of the present invention and FIG. 2 is a diagram showing a case (external package) of the ink cartridge of FIG. 1.

As shown in FIG. 1, ink cartridge 200 is filled with an ink from ink inlet 242 into ink bag 241. Air is discharged from the bag and the ink let 242 is sealed. When the cartridge is used, ink outlet 243 made of rubber member is perforated by a needle to provide ink to the apparatus.

The ink bag 241 is formed by use of aluminum laminated film or the like which is not air-permeable. The ink bag 241 is generally, as shown in FIG. 2, stored in a cartridge case 244 made of plastic and is used by being installed in each type of inkjet recording apparatus in a detachable manner.

Ink cartridge of the present invention stores ink of the ink-media set of the present invention and can be installed in a detachable manner in each type of inkjet recording apparatus and it is especially preferable that the ink cartridge is used by being installed in an inkjet recording apparatus of the present invention to be described later in a detachable manner.

(Ink Jet Recording Apparatus and Ink Jet Recording Method)

Ink jet recording apparatus of the present invention includes at least ink spraying units and furthermore, includes other units, such as stimulating units, controlling units, or the like, accordingly selected depending on the necessity.

Ink jet recording method of the present invention includes at least ink spraying process and furthermore, includes other process such as stimulating process, controlling process, or the like, accordingly selected depending on the necessity.

The inkjet recording method of the present invention can be performed appropriately by the inkjet recording apparatus of the present invention and the ink spraying process can be performed appropriately by the ink spraying unit. Moreover, the other processes can be performed by the other units appropriately.

—Ink Ejecting Process and Ink Ejecting Means—

In the ink ejecting process, the ink in the ink-media set of the present invention is stimulated and the ink is sprayed to record images on the recording medium in the ink-media set of the present invention.

In the ink ejecting unit, the ink in the ink-media set of the present invention is stimulated and the ink is sprayed to record images on the recording medium in the ink-media set. The ink ejecting unit is not specifically limited, for example, various types of nozzles for discharging inks can be used.

In the present invention, it is preferable that at least part of liquid chamber, fluid resistance portion, vibration board, and nozzle member of inkjet head is made from material that includes at least either silicon or nickel.

It is preferable that nozzle diameter of inkjet nozzle is 30 µm or smaller and preferably, 1 to 20 µm. It is also preferable that a sub-tank for providing ink is provided on the inkjet head and the sub-tank is supplied with ink from ink cartridge via supply tube.

In the inkjet recording method of the present invention, it is preferable that maximum ink adhesion amount is between 8 and 20 g/m$^2$ when resolution of recording image is 300 dpi or more.

The stimulation can be generated by, for example, the stimulating unit and the stimulation includes heat, pressure, vibration, light and the like and any of them can be freely selected depending on the purpose. One of them can be used independently or two or more of them can be simultaneously used. Among them, heat and pressure are preferable for use.

Note that as the stimulating unit, for example, heating device, pressure device, piezoelectric device, vibration generation device, ultrasonic oscillator, light, and the like can be used and more specifically, for example, piezoelectric actuator such as piezoelectric device, thermal actuator that uses electricity heat exchanger such as heat element to utilize phase change caused by film boiling of liquid, shape-memory-alloy actuator which utilizes metal phase change caused by change of temperature, electrostatic actuator using static electricity, or the like can be used.

The method for ejecting ink in the ink-media set may be properly selected depending on the type of the stimulation. For example, when "heat" is used as the stimulation, thermal energy corresponding to recording signal is applied by use of, for example, a thermal head or the like, to the ink in inkjet head, bubbles are generated in the ink by the thermal energy, and then the ink is sprayed as droplets from nozzle holes of the inkjet head. In addition, when "pressure" is selected as the stimulation, for example, a voltage is applied to piezoelectric device attached to a position called pressure room in ink passage in inkjet head, the piezoelectric device bends, reducing the capacity of the pressure room, to have the ink pressed and sprayed out from nozzle holes of the inkjet head.

It is preferable that size of the ink droplets sprayed out is between 3 and 40 pl, the speed of the droplets when pressed and sprayed out is between 5 and 20 m/s, the drive frequency is 1 kHz or more, and the resolution is 300 dpi or more.

The controlling unit may be properly selected depending on the purpose, examples thereof include instruments such as sequencers and computers.

When the ink has a relatively low surface tension, such as one used in the ink-media set of the present invention, it is preferable that nozzle plate of an inkjet head is superior in water repellency and ink repellency. This is because nozzle plate having superior water repellency and ink repellency enables meniscus of ink having low surface tension to be formed normally, thus allowing ink droplets to be formed (to be particulate) well. When meniscus is normally formed, ink is not pulled over to a certain direction when sprayed and as a result, sprayed ink is prevented from curving and image having high position accuracy of dots can be obtained.

When the printing is performed on a recording medium having a low absorption rate such as the recording medium used in the ink-media set of the present invention, position accuracy of dots significantly affects the quality of image. That is, on a recording medium having low absorption rate, if only a little deterioration of position accuracy of dots occurs, ink does not spread well, causing pinholes where ink does not cover. Such points lead to uneven image density or deterioration of image density and causes deterioration of quality of image.

However, the inkjet head used in the present invention has high position accuracy of dots even when ink having low surface tension is used, and therefore ink covers recording medium even when medium having low absorption rate is used. Thus uneven image density or deterioration of image density is prevented and printed material having high image quality can be obtained.

It is preferable that surface roughness of ink repellent layer used in the present invention is smaller than 0.2 μm. By setting the surface roughness smaller than 0.2 μm, the amount of leftover in wiping can be reduced.

Figure 8:
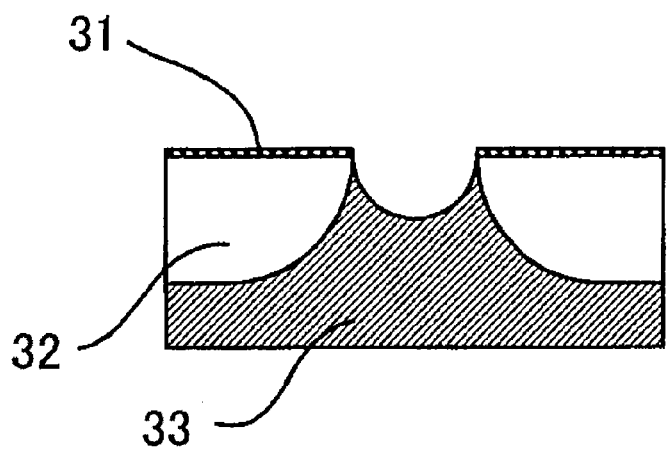
FIG. 8 is a schematic cross-sectional view showing an example of a nozzle plate of the inkjet head of the present invention.

FIGS. 8 and 9 show cross-sectional views of a nozzle plate of an inkjet head used in the present invention.

In the present embodiment, a nozzle plate 32 which is a plate base material of an inkjet head is manufactured by electroforming of Ni and on the surface thereof, ink repellent film 31 which is a silicone resin film having thickness of more than 1 Å (0.1 nm) is formed. It is preferable that the surface roughness of the ink repellent film 31 is Ra: 0.2 μm or smaller. Moreover, it is preferable that the film thickness of the ink repellent film 31 is more than 0.1 μm, and more preferably 0.5 μm or more.

Figure 9A:
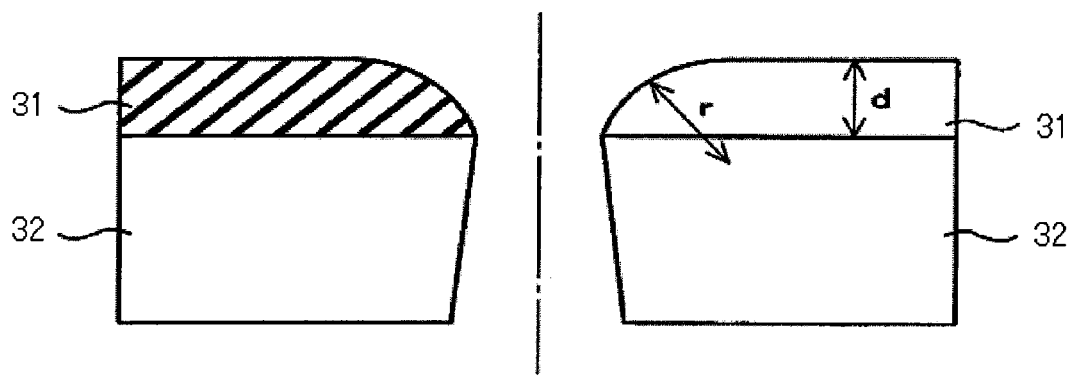
FIG. 9A is a schematic cross-sectional view showing a nozzle plate of the inkjet head of the present invention.
Figure 9B:
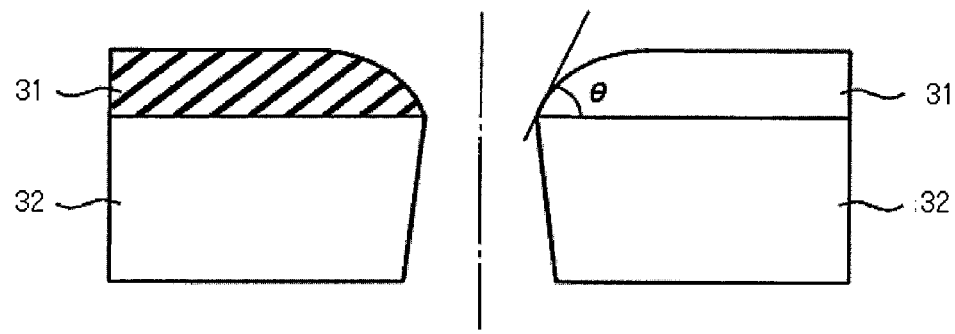
FIG. 9B is a schematic cross-sectional view showing a nozzle plate of the inkjet head of the present invention.
Figure 9C:
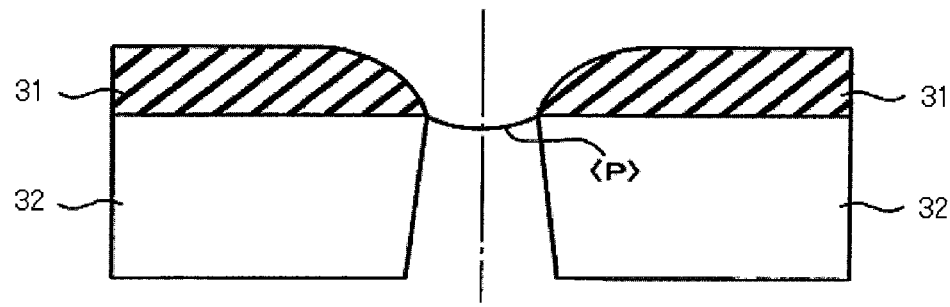
FIG. 9C is a schematic cross-sectional view showing a nozzle plate of the inkjet head of the present invention.

When ink is filled, as shown in FIG. 9C, meniscus (liquid level) P is formed in the boundary between the ink repellent film 31 of silicone resin film and the nozzle plate 32.

In the ink repellent film formed on s plate surface where ink discharging opening (nozzle) of the inkjet head is prepared, the area of the aperture's cross-section perpendicular to the center line of the aperture increases gradually along with the distance from the plate surface at around the ink-ejecting aperture.

It is preferable that the shape of the ink repellent film in the vicinity of aperture has a curved surface shape. It is also preferable that the curvature radius of curve of ink repellent film in the vicinity of the opening in the cross-section of plain surface including centerline of the aperture is higher than the thickness of the ink repellent film.

In addition, it is also preferable that a curved line of the ink repellent film from an end of the opening to the vicinity of the opening in the cross-section of plain surface including centerline of the opening forms an approximate circular arc line and curvature radius of the circular arc is higher than the thickness of the ink repellent film.

Furthermore, it is preferable that a tangent line that passes through the end of the opening of the ink repellent film in the cross-section of plain surface including centerline of the opening forms an angle below 90° from the surface of nozzle material including the end part.

The opening of the nozzle plate 32 is made to have a cross-section made by plain surface perpendicular to the centerline shown by dashed-dotted line in FIGS. 9A to 9C become approximately elliptic with the centerline as its center. Moreover, ink repellent film 31 formed on the ink discharging surface of the nozzle plate 32 is formed to have its cross-section area made by plain surface perpendicular to the centerline become gradually larger as the cross-section distances from the nozzle plate 32.

More specifically, the aperture of the ink repellent film 31 is round shaped and curved line from an end of opening of the nozzle plate 32 to the vicinity of opening has curvature radius r. It is preferable that the curvature radius r is larger than thickness d in area other than the vicinity of opening of the ink repellent film 31.

The thickness d is the thickness of the ink repellent film 31 other than round part thereof, which is the opening part, and it is preferable that the thickness d is the maximum thickness of the ink repellent film.

As described above, because opening of the nozzle plate 32 and opening of the ink repellent film 31, which are articulated with each other, have a shape approximately without a sharp end (smooth curved line without radical part) that does not catch wiper or the like, it becomes possible to make the ink repellent film 31 free from being separated from the nozzle plate 32 due to catch of wiper by the radicalized part even when wiping is performed by the wiper made of rubber or the like.

Moreover, it is preferable that as shown in FIG. 9B, a tangent line that passes through the end of the opening of the ink repellent film 31 in the cross-section of plain surface including centerline of the opening of the nozzle plate 32 forms an angle 0 below 90° from the surface of the nozzle plate 32 that includes end part of the aperture of the nozzle plate 32.

As described above, the angle θ between the tangent line at the end of opening of the ink repellent film 31 and the nozzle plate 32 is below 90°. Thus, meniscus (liquid surface) P is formed stably in the boundary between the ink repellent film 31 and the nozzle plate 32, greatly reducing the possibility that meniscus P is formed in other area. As a result, the meniscus surface is stabilized and the stability of ink ejecting can be improved in the image forming device using an inkjet head including the nozzle plate 32.

As for the silicone resin in the present embodiment, room-temperature curable liquid silicone resins are preferable, and more preferably are those of hydrolysis reaction. In the Examples described below, SR2411 (by Dow Corning Toray Co.) was used.

Table 1 shows results of evaluation on the form of area from an end of opening of the nozzle plate 32 to the vicinity of an end of the opening, ink pool around the nozzle, edge separation, and stability of ink ejecting.

TABLE 1

| Edge Shape | | Ink Pool | Edge Separation | Ejection Stability |
|---|---|---|---|---|
| Sharp | | Partially Occur | Occur | Good |
| Non-Sharp (Round Shape) | $\theta \leq 90°$ | None | None | Good |
| | $\theta > 90°$ | None | None | Bad |
| | $r \geq d$ | None | None | Good |
| | $r < d$ | None | Partially Occur | Bad |

As shown in Table 1, when a sharp end exists at an edge portion of the ink repellent film 31 (vicinity of an end of opening), the ink was left around the nozzle and the edge was separated by wiping.

Figure 10A:
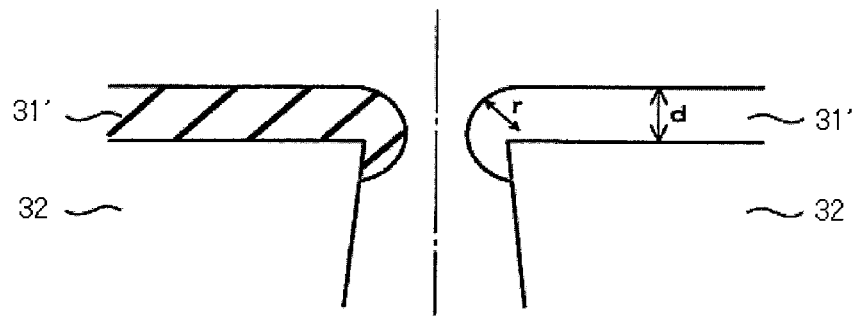
FIG. 10A is a schematic cross-sectional view showing a nozzle plate of the inkjet head for comparison.
Figure 10B:
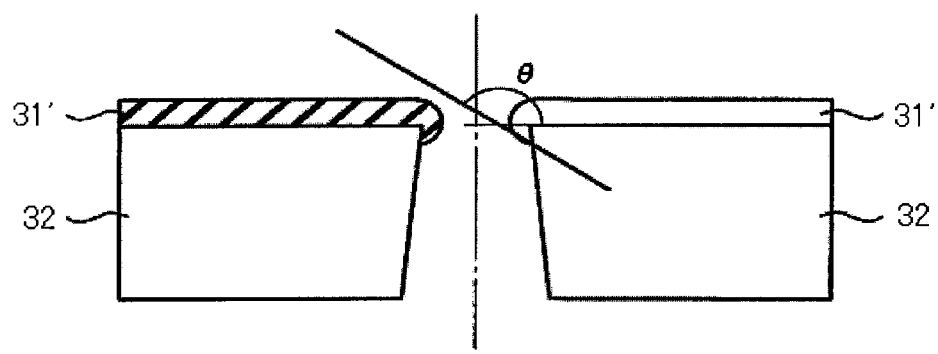
FIG. 10B is a schematic cross-sectional view showing a nozzle plate of the inkjet head for comparison.

With the round shaped end, the ink was not left; but when compared, one in FIG. 10A showed a partial edge separation when r<d, and one in FIG. 10B showed unstable spraying of droplets when θ>90°.

Figure 10C:
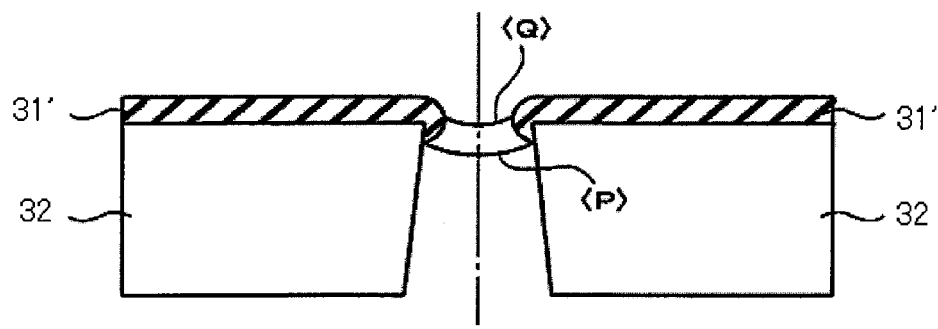
FIG. 10C is a schematic cross-sectional view showing a nozzle plate of the inkjet head for comparison.

As shown in FIG. 10C, when r<d or θ>90°, there are cases where meniscus (liquid surface) P is formed in the boundary between the ink repellent film 31 and the nozzle plate 32 and where meniscus Q is formed in convex part (part where cross-section area perpendicular to center line in the opening becomes smallest) toward the center of opening in ink repellent film 31'. Therefore, there may appear a fluctuation in the stability of ink spraying when recording images by the inkjet recording apparatus using an inkjet head including the nozzle plate 32.

Next, the manufacturing method of a nozzle member of an inkjet head according to the above described present embodiment will be explained.

Figure 11:
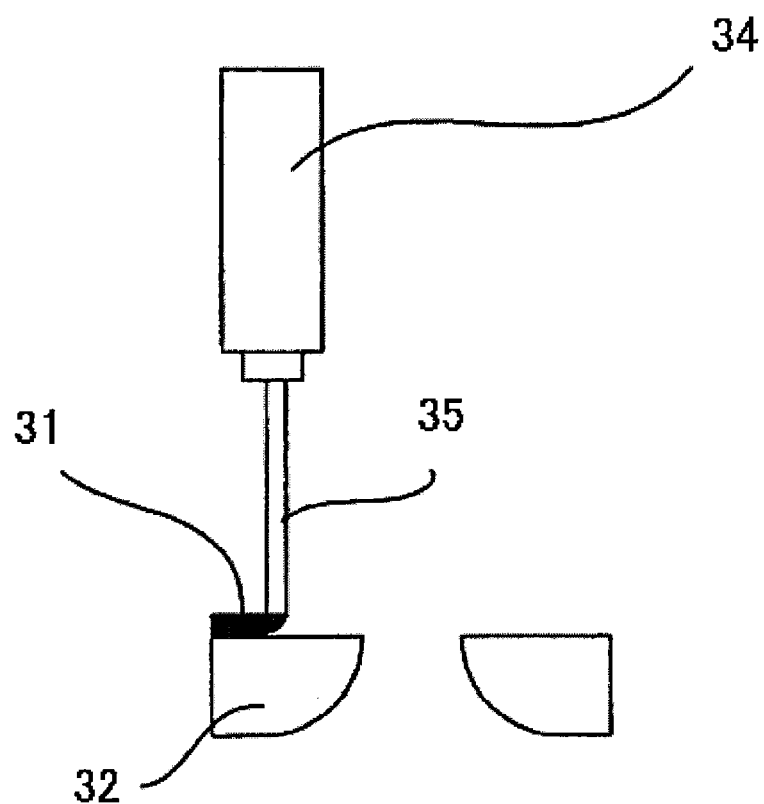
FIG. 11 shows a condition where ink-repellent film is formed by coating a silicone resin using a dispenser.

FIG. 11 shows that ink repellent film 31 is formed by applying a silicone resin using a dispenser 34 according to the present embodiment.

On the ink discharging side surface of a nozzle plate 32 manufactured by electroforming, the dispenser 34 for applying silicone solution is disposed. The dispenser 34 is controlled to scan on the nozzle plate 32, maintaining a certain predetermined distance between the nozzle plate 32 and tip of a needle 35, while a silicone resin is discharged from the tip of the needle 35. Thus, the silicone resin film can be selectively made on the ink discharging surface of the nozzle plate 32 as shown in the above-mentioned FIGS. 8 and 9A to 9C.

As the silicone resin used in the present embodiment, room-temperature curable liquid silicone resin SR2411 (by Dow Corning Toray Co., viscosity: 10 mPa·s) was used. A little amount of silicone was found on the nozzle holes and behind the nozzle plate. Thickness of the silicone resin film thus made selectively was 1.2 μm and the surface roughness (Ra) was 0.18 μm.

Figure 12A:
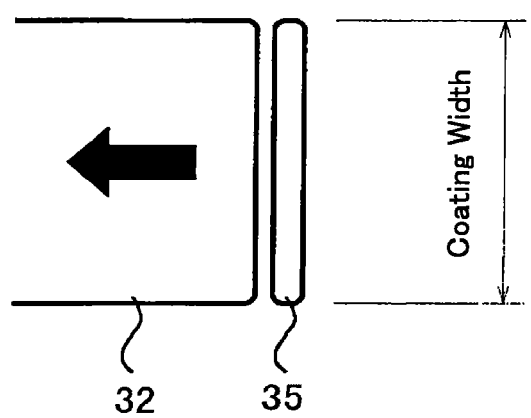
FIG. 12A shows relationship between an opening for coating at the edge of a needle of the present invention and coating width of a nozzle plate which is a target of coating.

Application hole of the tip of the needle 35 according to the present embodiment has a width that is sufficient for the application width on the nozzle 32 to which application is performed as shown in FIG. 12A. Therefore, the dispenser 34 can complete the application of silicone resin to the target by scanning the dispenser 34 only once.

Figure 12B:
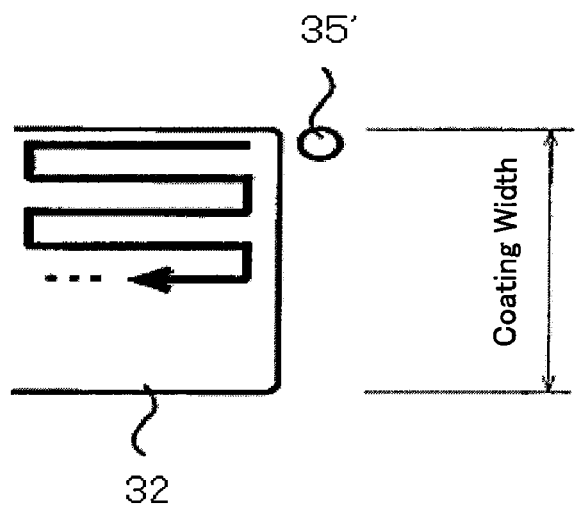
FIG. 12B shows relationship between an opening for coating at the edge of a generally used inkjet head needle and coating width of a nozzle plate which is a target of coating.

In other words, scanning direction for application can be only one direction and there is no need to change the direction, as shown in FIG. 12B, or to scan to the opposite direction.

The tip of the needle 35 was typically narrower than the application width of the nozzle plate 32, to which application is performed, as shown in FIG. 12B. Therefore, it was necessary to change scanning direction by 90° or to scan to the opposite direction and perform the scanning for a plurality of times, which made it difficult to perform uniform application to the application target.

According to the present embodiment, application hole of the tip of the needle 35 is prepared to have sufficient width for the application width to the nozzle plate 32. This makes it possible to apply uniformly on the target, leading to an accurate surface.

Figure 13:
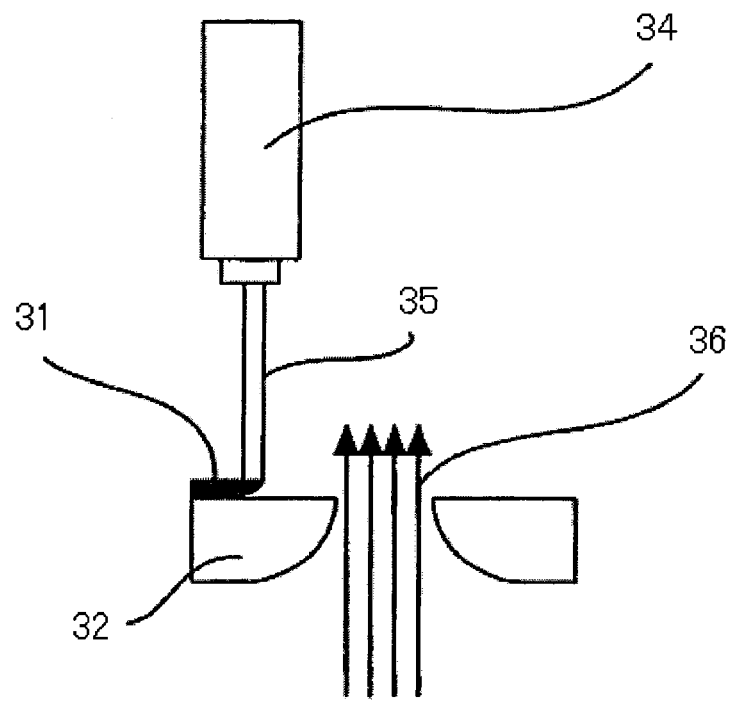
FIG. 13 shows coating activity using a dispenser.

FIG. 13 shows application operation by the dispenser 34 according to the present embodiment. The configuration is the same as that of FIG. 11, except that a silicone is applied while discharging gas 36 from a nozzle hole (opening) of the nozzle plate 32. The gas 36 may be, for example, air and any gas as long as the gas hardly undergoes a chemical reaction with the silicone.

The application while discharging the gas 36 from the nozzle hole makes possible to form a silicone resin film on the surface of the nozzle, except for the nozzle hole of the nozzle plate 32.

Figure 14:
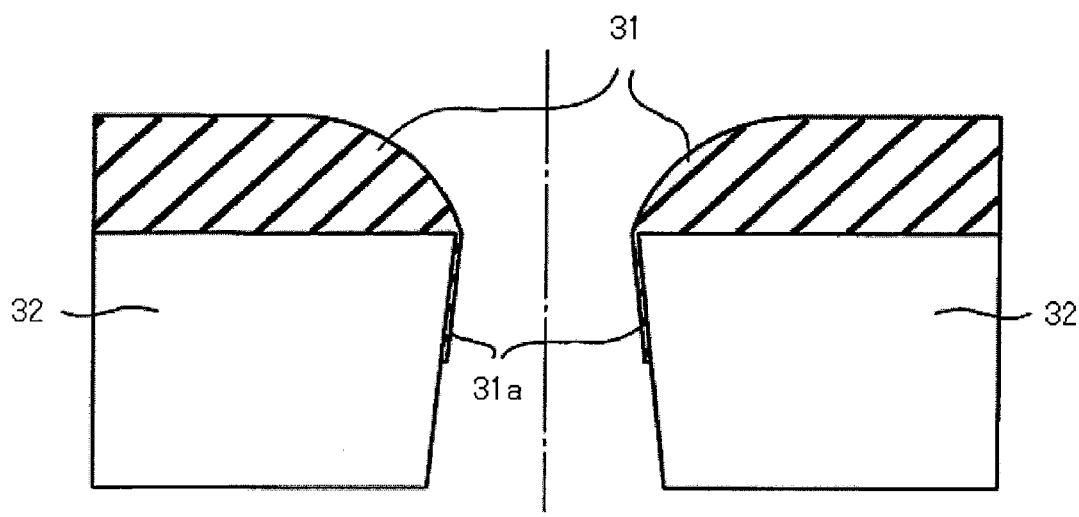
FIG. 14 shows a condition where an ink-repellent layer of silicone resin has been formed to the desired depth of inner wall of a nozzle.

Moreover, it is possible to form an ink repellent layer of silicone resin as shown in FIG. 14 by applying the silicone resin without discharging the gas 36 and then discharging the gas 36 from the nozzle plate 32 when the silicone resin impregnates into a pre-determined depth (e.g. a few microns). That is, in addition to the ink repellent film 31 the ink discharging surface, very thin ink repellent film 31a (ink repellent film on the inner wall of opening) can be formed to a pre-determined depth from the edge of the aperture of the nozzle plate 32.

The resulting ink repellent film 31 of the nozzle plate was wiped by use of an EPDM rubber (hardness: 50°). As a result, the ink repellent film 31 of the nozzle plate maintained proper ink repellency after 1,000 times of wiping. In addition, the nozzle member on which the ink repellent film being formed was dipped into the ink at 70° C. for 14 days. As a result, it was confirmed that ink repellency similar to the initial film was maintained.

Figure 15:
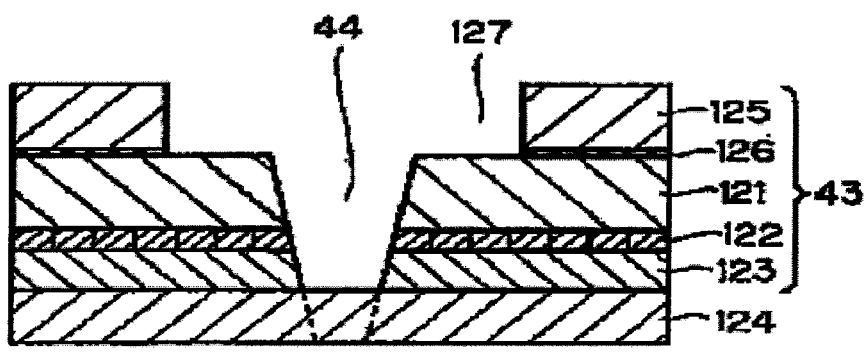
FIG. 15 shows an example of an inkjet head of the present invention, showing a state where a nozzle hole has been formed by excimer laser processing.

FIG. 15 shows an example of an inkjet head of the present invention and shows the state where a nozzle hole was formed by excimer laser processing. A nozzle plate 43 was made by joining a resin member 121 and a highly rigid member 125 by use of thermoplastic adhesive 126 and on the surface of the resin member 121, $SiO_2$ thin film layer 122 and fluoric water repellent layer 123 were sequentially laminated. A nozzle hole 44 having required diameter was formed on the resin member 121 and a nozzle continuous hole 127 communicating with the nozzle hole 44 was formed on the highly rigid member 125. $SiO_2$ thin film layer 122 was formed by a method which requires relatively low heat, that is, a method that enables formation of a film in a temperature range that does not thermally affect the resin member. Specifically, sputtering, ion beam evaporation, ion plating, chemical vapor deposition (CVD), plasma chemical vapor deposition (P-CVD) or the like are preferable.

It is preferred that thickness of the $SiO_2$ thin film layer 122 is as thin as possible provided that the adhesion can be secured, from the viewpoint of processing period and material cost, since excessive thicknesses of films may result in problems in nozzle hole processing by excimer laser. That is, the resin member 121 may be clearly processed in the shape of nozzle hole, however, a part of the $SiO_2$ thin film layer 122 may not be sufficiently processed and requires more processing. As for the range where the adhesion is secured and no $SiO_2$ thin film layer remains unprocessed in the excimer laser processing, it is appropriately assumed that the film thickness is 1 Å to 300 Å (0.1 to 3 nm), more preferably between 10 Å and 100 Å (1 to 10 nm). From experimental results, processability by use of excimer laser showed no problem when $SiO_2$ film thickness was 30 Å (3 nm), maintaining sufficient adhesiveness. In addition, when the thickness was 300 Å (30 nm), there appeared a little processing remainder in an allowable range; when the thickness exceeded 300 Å (30 nm), there appeared a considerable amount of processing remainder and also a nozzle deformation, suggesting impossibility of the subsequent usage.

Any material can be used as the material of ink repellent layer as long as the material repels ink and specifically, fluoric water repellent material, silicone water repellent material, or the like can be used.

Many kinds of material are known as the fluoric water repellent material. Here, a mixture of perfluoropolyoxetane and perfluoropolyoxetane variant (by Daikin Industries, Ltd., Optool DSX) has been vapor deposited to obtain a thickness between 1 Å and 30 Å (0.1 to 3 nm), thus obtaining required water repellency. Experiment results show that there was no difference in layers having thickness of 10 Å, 20 Å, and 30 Å in water repellency and wiping durability performance. Therefore, taking consideration of the cost and the like, it is preferable to set the thickness between 1 Å and 20 Å (0.1 to 2 nm). Note that depending on the ink used, there are cases where the thicker water repellent film allows maintenance of the performance for a longer period of time, considering the reliability. In that case, it is preferable to set the thickness from 100 Å to 200 Å (10 to 20 nm). Moreover, on the surface of the fluoric water repellent layer 123, an adhesive tape 124, manufactured by applying adhesive on a resin file, is attached to assist excimer laser processing. In addition, silicone water repellent material can also be used.

As the silicone water repellent material, room-temperature curable liquid silicone resin or elastomer can be listed and one that forms an ink repellent film by polymerization hardening when applied on a surface of a base material and left in air at room temperature is preferable.

The silicone water repellent material may be thermosetting silicone resin or elastomer that forms an ink repellent film when applied on a surface of a base material and heat processed to harden.

Silicone water repellent material may be UV curable liquid silicone resin or elastomer that forms an ink repellent film when applied on a surface of a base material and irradiated with ultraviolet to be hardened.

It is preferable that viscosity of silicone water repellent material is 1000 centipoise (cP) or below.

Figure 16:
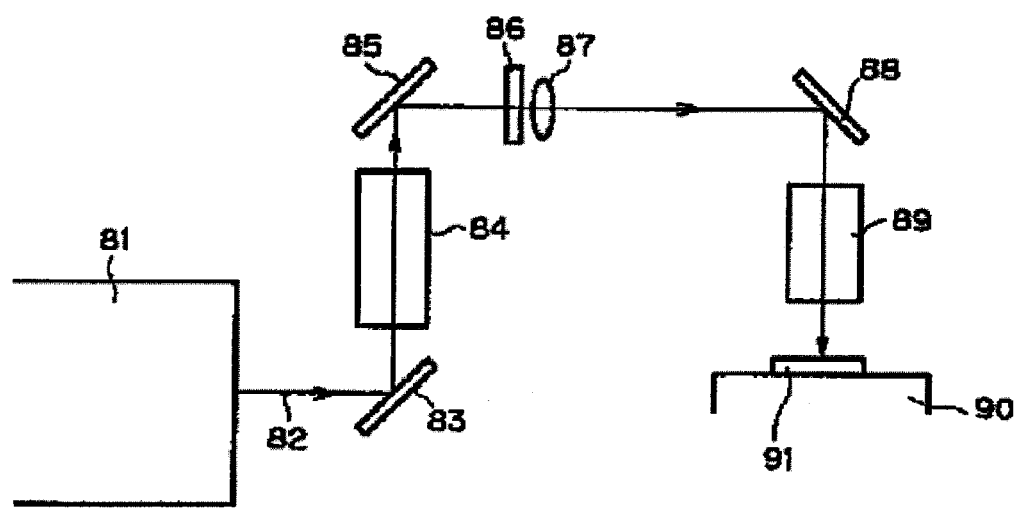
FIG. 16 shows configuration of an excimer laser processing machine used to process a nozzle hole.

FIG. 16 shows a configuration of an excimer laser processor used to process a nozzle hole. Excimer laser beam 82 emitted from a laser oscillator 81 is reflected by mirrors 83, 85, and 88 to be led to a processing table 90. On a light path of the laser beam 82 to the processing table 90, a beam expander 84, a mask 86, a field lens 87, and imaging optics 89 are disposed in predetermined positions so that optimum beam can reach a processing target. A processing target (a nozzle plate) 91 is positioned on the processing table 90 exposed to the laser beam. The processing table 90 is configured by a commercially available XYZ table or the like and depending on necessity, processing target 91 can be moved so that a required position thereof to be irradiate with laser beam is assured. Here excimer laser was used as laser for explanation, but various types of laser are available as long as the laser is short wavelength ultraviolet laser capable of ablation processing.

FIGS. 17A to 17E show a nozzle plate manufacturing process in the manufacturing method of an inkjet head of the present invention.

Figure 17A:
FIG. 17A shows base material of nozzle forming member in the process of manufacturing a nozzle plate in the manufacturing method of an inkjet head.

FIG. 17A shows a base material of the nozzle forming member. In the process, Kapton (a polyimide film with no particles, DuPont Co.) is used as resin film 121. Generally, particles of $SiO_2$ (silica) or the like are added in the material of the polyimide film, taking consideration of handling easiness (slippage) in a roll film handling device. When nozzle holes are processed by excimer laser, particles of $SiO_2$ (silica) affects processability by excimer laser, causing deformation of a nozzle. Therefore, in the present invention, a film with no $SiO_2$ particles is used. Moreover, a polyimide film of Upilex (by Ube Industries Ltd.) may also be used as plate base material. Particles in Upilex are very fine, thus can be used as it is.

Figure 17B:
FIG. 17B shows process of forming a SiO$_2$ thin film layer on the surface of a resin film.

FIG. 17B shows a forming process of $SiO_2$ thin film layer 122 on the surface of resin film 121. Sputtering method in a vacuum chamber is preferable for the formation of the $SiO_2$ thin film layer 122 and film thickness of around 1 Å to 300 Å (0.1 to 30 nm) is preferable. Here, the film is formed to have a thickness of 10 to 100 Å (1 to 10 nm). As the sputtering method, using a method of sputtering Si first and irradiating $O_2$ ion on the surface of Si can be used. This method enables improvement of adhesiveness of $SiO_2$ film to the resin film 121 and obtaining uniform and dense film and is more effective to improve wiping durability of the water repellent film.

Figure 17C:
FIG. 17C shows process of coating fluorine water repellent agent.

FIG. 17C shows process of applying fluorine water repellent material 123a to the film. Methods such as spin coater, roll coater, screen printing, spray coater, or the like can be used as application method, but forming a film by vacuum deposition is more effective because this method allows improvement of adhesiveness of the water repellent film. Moreover, vacuum deposition performed in the vacuum chamber after the $SiO_2$ thin film layer 122 in FIG. 17B has been formed makes it possible to obtain more preferable effect. Conventionally, because a work was taken out from the vacuum chamber once the $SiO_2$ thin film layer 122 has been formed, impurity would attach on the surface of the work, which might lead to lowered adhesiveness. Note that various kinds of material are known as fluorine water repellent material and here perfluoropolyoxetane, perfluoropolyoxetane variant, or mixture of both can be used as fluorine amorphous compound. This makes it possible to obtain required water repellency. The above "Optool DSX" (by Daikin Industries Ltd.) is also called "alkoxysilane end-modified perfluoropolyether".

Figure 17D:
FIG. 17D shows process of leaving a film in air after a water repellent film has been vapor deposited.

FIG. 17D shows a process of leaving the film in the air following the deposition of water repellent film. Due to this process, fluorine water repellent agent 123a and the $SiO_2$ thin film layer 122 are chemically joined by moisture in air to form the fluorine water repellent layer 123.

Figure 17E:
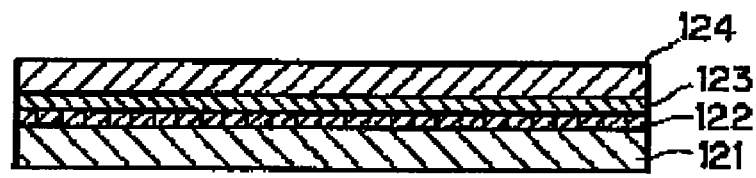
FIG. 17E shows process of putting adhesive tape on the film.

FIG. 17E shows a process of attaching the adhesive tape 124. On the surface where the fluorine water repellent layer has been applied, the adhesive tape 124 is attached. When the adhesive tape 124 is attached, attention must be paid so that air bubble does not occur. That is because if air bubble occurs, quality of a nozzle hole formed on a position where the bubble exist may be deteriorated due to adhesion at the processing.

Figure 17F:
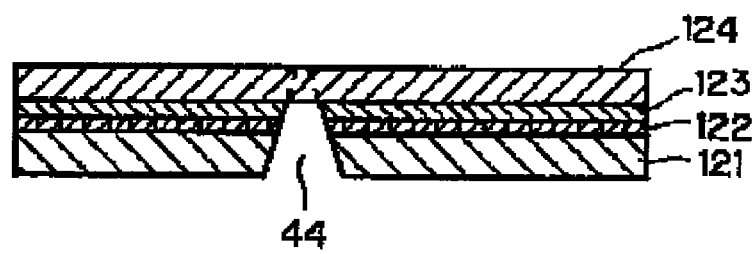
FIG. 17F shows a processing of a nozzle hole.

FIG. 17F shows a process of processing a nozzle hole 44. In this process, excimer laser is emitted from the polyimide film 121 side to form the nozzle hole 44. Following the processing of the nozzle hole 44, adhesive tape 124 is peeled off. Note that here explanation of the high rigidity member 125 used to raise the rigidity of the nozzle plate 43 explained in FIG. 15 has been omitted. If that is applied in this process, it is appropriate to perform the processing between the process of FIG. 17D and the process of FIG. 17E.

Figure 18:
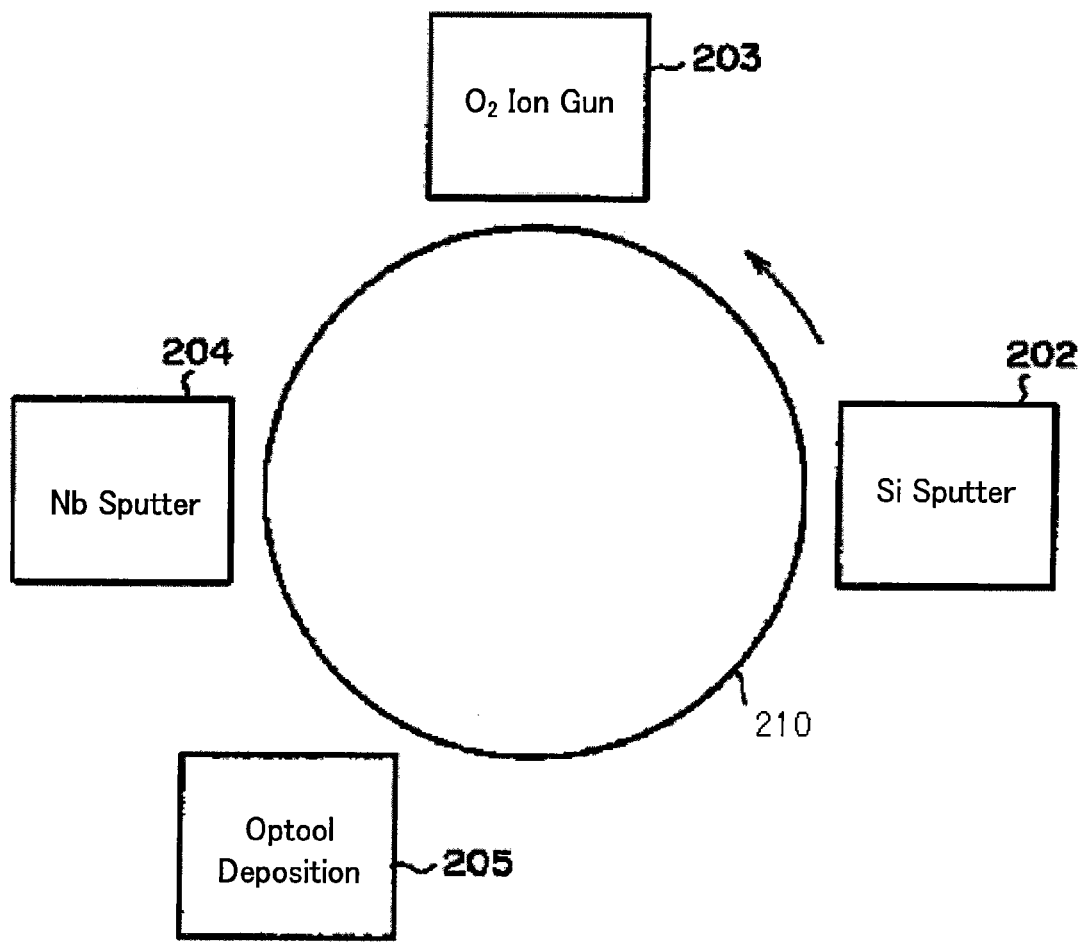
FIG. 18 schematically shows an apparatus used to manufacture an inkjet head according to an inkjet head manufacturing method.

FIG. 18 schematically shows an apparatus used to manufacture an inkjet head according to an inkjet head manufacturing method of the present invention.

This apparatus was manufactured by mechanizing a method called "Metamode process" developed by Optical Coating Laboratory Inc. (OCLI, U.S.) is used to manufacture an antireflection film for a display or the like, or to manufacture an antifouling film. As shown in FIG. 18, in four spots around a drum 210, Si sputter 202 which is a station, $O_2$ ion gun 203, Nb sputter 204, and Optool deposition 205 are disposed and all of them are in a chamber which can vacuum. First, Si is sputtered by the Si sputter 202 and then $O_2$ ion is irradiated to Si by the ion gun 203 to make $SiO_2$. Then, Nb and Optool DSX are deposited appropriately by the Nb sputter 204 and the Optool deposition 205. To manufacture an antireflection film, deposition is performed after Nb and SiO$_2$ have been accumulated to have a predetermined thickness. In the present invention, function of the antireflection film is not required and therefore Nb is unnecessary. Hence, only one layer of SiO$_2$ and Optool DSX are required. By use of this apparatus, as described above, it becomes possible to perform vacuum deposition of Optool DSX in the vacuum chamber after the SiO$_2$ thin film layer 122 has been formed.

It is preferable that the critical surface tension of the ink repellent layer is 5 to 40 mN/m and 5 to 30 mN/m is more preferable. When the critical surface tension exceeds 30 mN/m, the nozzle plate may excessively wetted by the ink. Therefore, if the printing is repeatedly, discharged ink would not go straight or error in turning ink into particles might occur. When the critical surface tension exceeds 40 mN/m, such irregularities would occur from an early stage of repeated printing due to excessive wetting by the ink.

A nozzle plate having ink repellent layer was actually manufactured by applying ink repellent material shown in Table 2 on an aluminum substrate and drying it by heating. Result of measuring the critical surface tension of the ink repellent layer is shown in Table 2.

Here, the critical surface tension can be obtained by Zisman method. That is, certain liquid of which surface tension has already been known is dropped on an ink repellent layer and contact angle θ was measured. When the surface tension of the liquid is plotted on X axis and cos θ is plotted on Y axis, a soaring straight line is obtained (Zisman plot). Surface tension when the straight line hits Y=1 (θ=0) can calculated as critical surface tension γc. Critical surface tension can be calculated by other methods such as Fowkes method, Owens and Wendt method and Van Oss method.

Moreover, an inkjet head was manufactured using a nozzle plate having an ink repellent layer, similar to the above-mentioned head manufacturing method. Using this, cyan ink to be described later (cyan ink of Production Example 1 to be described later) was sprayed. Ink spraying process was video recorded for observation. In all the cases where each nozzle plate was used, ink was normally turned to be particles and stability of spraying was confirmed to be fine. The results are shown in Table 2.

<Cyan Ink>

20% by mass of copper phthalocyanine pigment containing polymer fine particle dispersion, 23% by mass of 3-ethyl-1,3-hexanediol, 8% by mass of glycerin, 2% by mass of 2-ethyl-1,3-hexanediol, 2.5% by mass of FS-300 (by DuPont Co.) as fluorine surfactant, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, cyan ink was manufactured.

TABLE 2

|  | Product Name | Critical Surface Tension | Stability of Spraying |
|---|---|---|---|
| Dow Corning Toray | SR2411 | 21.6 mN/m | Fine |
| Shin-Etsu Chemical Co., Ltd. | KBM7803 | 16.9 mN/m | Fine |
| Shin-Etsu Chemical Co., Ltd. | KP801M | 6.6 mN/m | Fine |

Here, one embodiment of an inkjet recording method of the present invention by an inkjet recording apparatus of the present invention will be explained with reference to figures.

Figure 3:
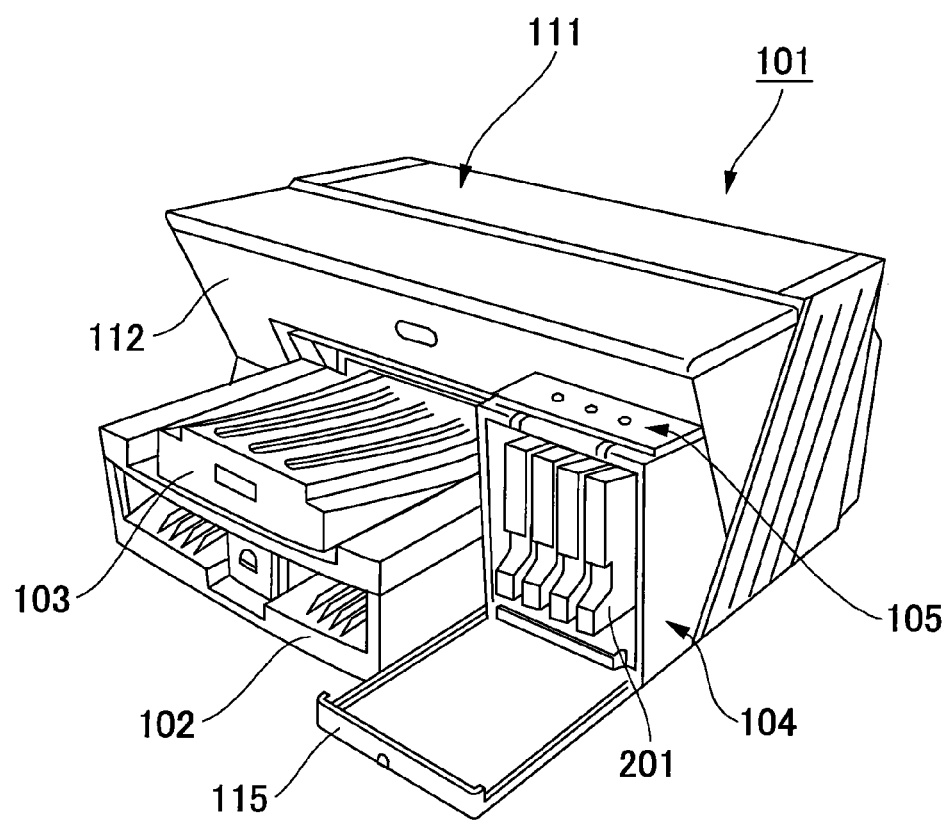
FIG. 3 is an oblique perspective figure of an inkjet recording apparatus with a cover of ink cartridge charger opened.

FIG. 3 schematically shows an example of an inkjet recording apparatus of the present invention. The inkjet recording apparatus shown in FIG. 3 includes an apparatus body 101, a paper feed tray 102 loaded to the apparatus body 101 for feeding paper, catch tray 103 which is loaded to the apparatus body 101 for stocking paper on which image was recorded (formed), and an ink cartridge loading part 104. On the upper surface of the ink cartridge loading part 104, control part 105 that has a control key or a display unit is disposed. The ink cartridge loading part 104 also has a front cover 115 which can be opened or closed freely to install or remove an ink cartridge 201.

Figure 4:
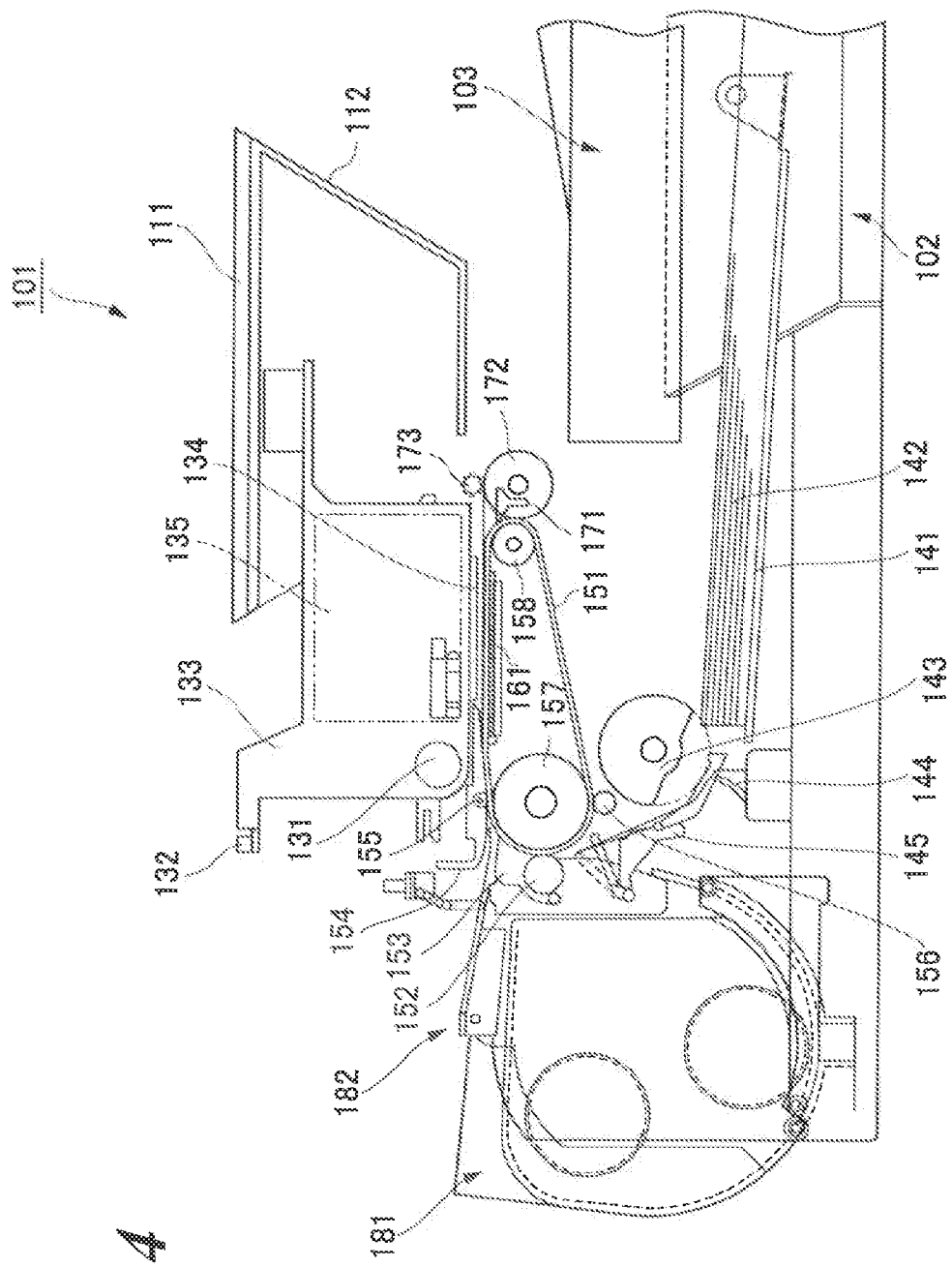
FIG. 4 is a schematic view explaining the over all configuration of the inkjet recording apparatus.
Figure 5:
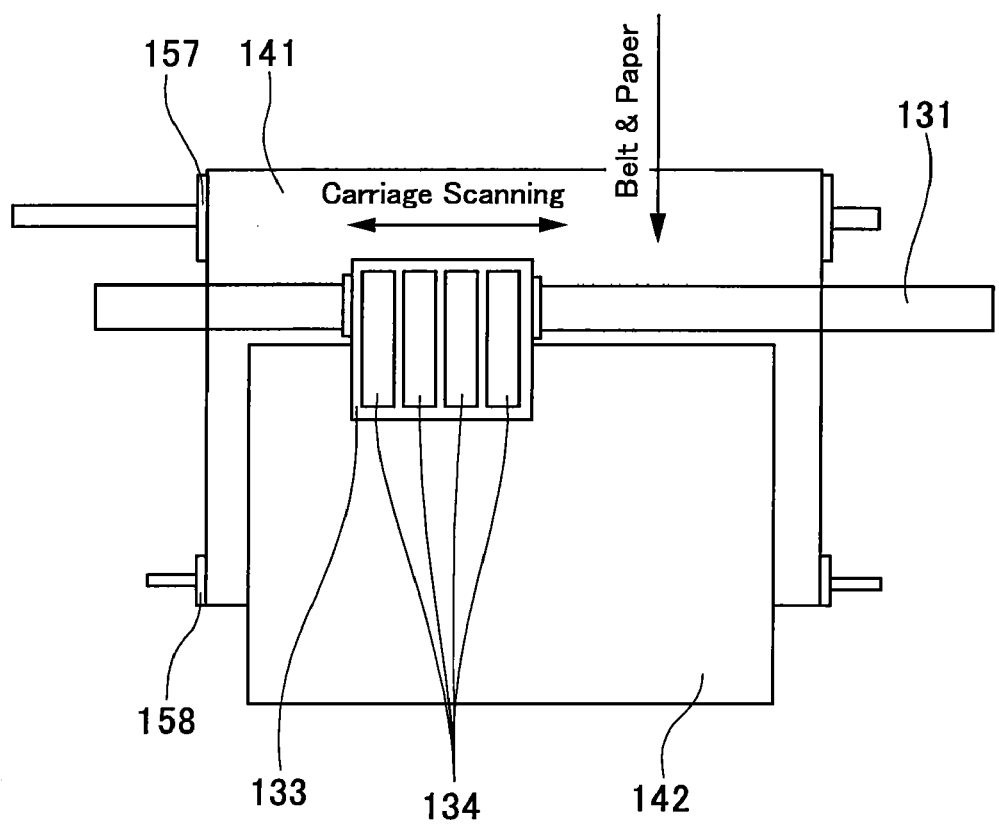
FIG. 5 is a schematic extended view showing an example of an inkjet head of the present invention.

In the apparatus body 101, as shown in FIGS. 4 and 5, a carriage 133 is held by a guide rod 131 which is a guide member and laterally bridges lateral plates (not shown), and a stay 132 so that the carriage 133 can freely slide to main scanning direction. The carriage 133 moves and scans by main scanning motor (not shown) in the direction suggested by the arrow in FIG. 5.

The carriage 133 includes an inkjet head 134 having four inkjet heads that discharge ink droplets of yellow (Y), cyan (C), magenta (M), and black (B). A plurality of ink outlets of the inkjet head 134 is disposed in a direction that crosses over the main scanning direction and ink droplet discharging direction of the inkjet head is set downward. As an inkjet head that configures the inkjet head 134, one that includes a piezoelectric actuator such as a piezoelectric device, a thermal actuator that uses an electricity heat exchanger such as heat element to utilize phase change caused by film boiling of liquid, a shape-memory-alloy actuator which utilizes metal phase change caused by change of temperature, electrostatic actuator, or the like can be used.

Moreover, in the carriage 133, a sub-tank 135 of ink of each color to provide the inkjet head 134 with ink of each color. To the sub-tank 135, ink of each color in the ink-media set of the present invention is supplied via an ink supplying tube (not shown) from an ink cartridge 201 of the present invention that is mounted on the ink cartridge loading part 104.

Meanwhile, paper feeding part for feeding paper 142 mounted on a paper loading part (plate) 141 of the paper feed tray 102 has a half-moon small roller (paper feed small roller 143) that feeds the paper 142 from the paper loading part 141 one by one and a separation pad 144, made of material having large friction coefficient, that faces the paper feed small roller 143 and the separation pad is biased to the paper feed small roller 143 side.

The paper 142 fed by the paper feeding part is transported to the lower side of the inkjet head 134 by a transportation unit which includes a transportation belt 151 that performs electrostatic absorption of the paper 142 to transport the paper, a counter roller 152 for transporting the paper 142 sent from the paper feeding part via a guide 145 by sandwiching the paper between the counter roller 152 and the transportation belt 151, a transportation guide 153 for changing the direction of the paper 142 sent to approximately vertically upward by approximately 90° so that the paper is put on the transportation belt 151, an edge pressure small roller 155 which is biased by a pushing member 154 to the transportation belt 151 side, and a charging roller 156 which is charging unit for charging the surface of the transportation belt 151.

The transportation belt 151 has no edge, is rolled and bridged between a transportation roller 157 and a tension roller 151 and is capable of revolving to the direction of belt transportation. The transportation belt 151 has, for example, a surface layer which works as paper absorption surface formed by co-polymer of tetrafluoroethylene and ethylene and a back layer (medium resistance layer, earth layer) which is formed by the same material and to which resistance control by carbon has been performed. Behind the transportation belt 151, a guide member 161 corresponding to imaging region by the inkjet head 134 is disposed. Note that a paper discharge unit is provided to discharge the paper 142 on which image has been recorded by the inkjet head 134 and the unit includes a separation pawl 171 for separating the paper 142 from the transportation belt 151, a paper discharge roller 172, and a paper discharge small roller 173 and below the paper discharge roller 172, the catch tray 103 is provided.

In the back surface part of the apparatus body 101, a both sides paper feed unit 181 is mounted in a removable manner. The both sides paper feed unit 181 turns back the paper 142 which is returned to the apparatus body 101 in an opposite direction to the rotation of the transportation belt 151 to feed the paper 142 between the counter roller 152 and the transportation belt 151 again. Note that on the upper surface of the both sides paper feed unit 181, a manual paper feed part 182 is provided.

With this inkjet recording apparatus, each piece of the paper 142 is separately fed and the paper 142 fed in the approximately vertical direction is guided by the guide 145 and transported by being sandwiched by the transportation belt 151 and the counter roller 152. Moreover, the paper 142 is guided by the transportation guide 153 to be pushed to the transportation belt 151 by the edge pressure small roller 155 and direction of the paper 142 is changed by approximately 90°.

At this time, the transportation belt 151 is charged by the charging roller 156 and the paper 142 is electrostatically absorbed by the transportation belt 151 to be carried. Then, by moving the carriage 133 and driving the inkjet head 134 corresponding to image signal, ink droplets are discharged to the paper 142, which is staying, to record one line of the image. When the paper 142 has been transported for a predetermined amount, next line is recorded. When end-of-recording signal or a signal that the end of the paper 142 has reached the recording region has been received, recording is finished and the paper 142 is discharged to the catch tray 103.

Then when near end of the ink remaining in the sub-tank 135 is detected, necessary amount of ink is supplied to the sub-tank 135 from the ink cartridge 201.

In this inkjet recording apparatus, when ink in the cartridge 201 of the present invention has been completely consumed, a chassis of the ink cartridge 201 can be taken apart to exchange ink bag in the chassis. Moreover, when the ink cartridge 201 is placed longitudinally to load ink from its front side, it can still provide ink stably. Therefore, when some other thing is placed on the upper part of the apparatus body 101, e.g., when the apparatus body 101 is stored in a rack or the like, exchange of the ink cartridge 201 can be performed easily.

The method has been explained by using an example of a serial type (shuttle type) inkjet recording apparatus; in addition, method can be similarly applied to a line type inkjet recording apparatus including a line type head.

Moreover, when printing speed is increased, in the inkjet recording apparatus and the inkjet recording method of the present invention, drying promotion unit (hereinafter often referred to as a drying device) can be used together to avoid recording apparatus from getting dirty by ink or recording medium from getting dirty by offset, both of which may be caused when ink is not sufficiently dried after recording. As the drying promotion unit, a blower fan without a heat generator, a heat generator such as a halogen lump or other heater, a combination of a blower and a heat generator, a microwave drying device, or the like can be preferably used.

The inkjet recording apparatus and the inkjet recording method of the present invention can be preferably applied to various recording devices including, for example, an inkjet recording printer, a facsimile device, a copier, and a hybrid machine featuring printer, facsimile, and copier.

An inkjet head to which the present invention is applied will be explained.

Figure 6:
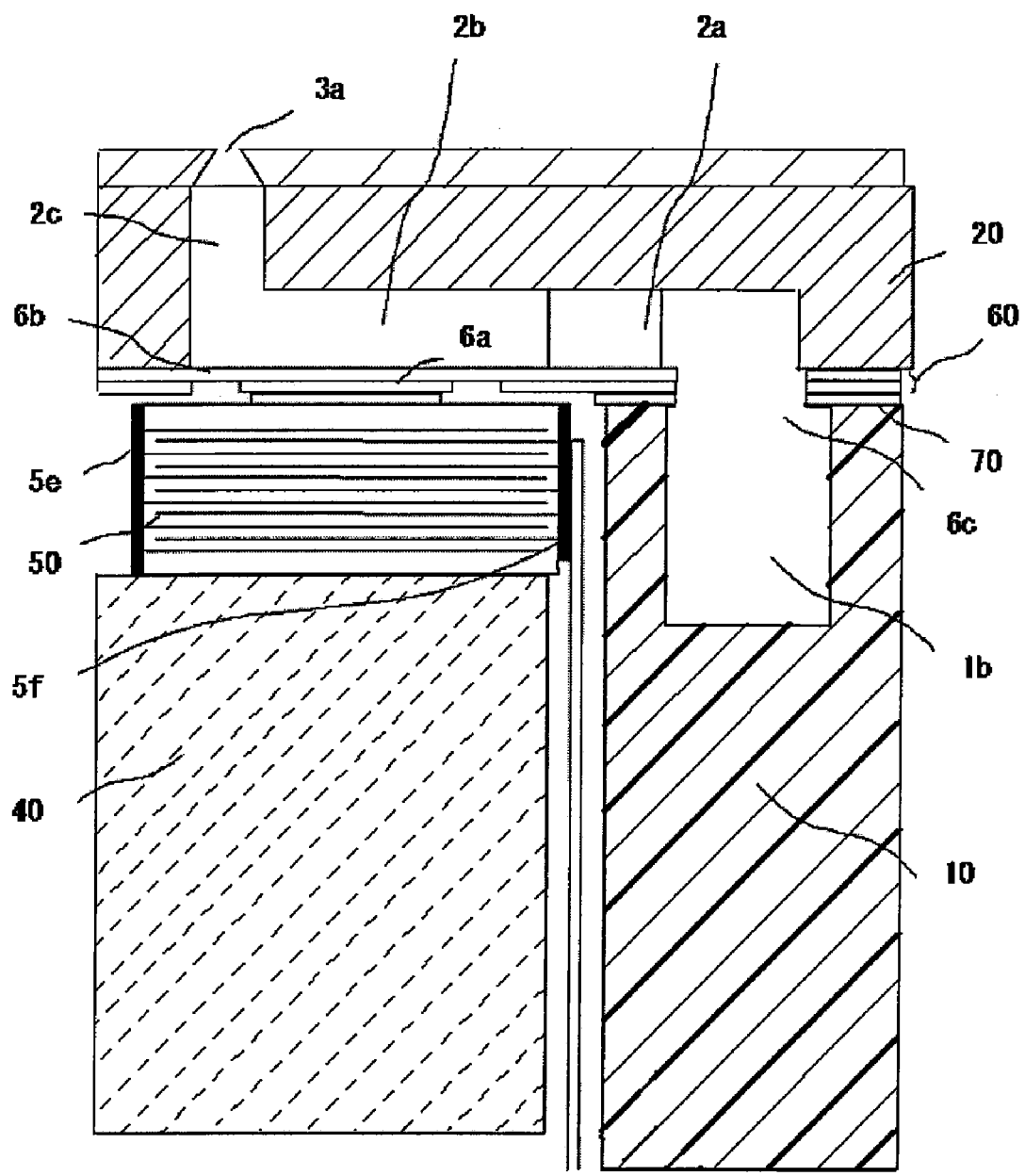
FIG. 6 is a schematic extended view showing an example of an inkjet head of the present invention.
Figure 7:
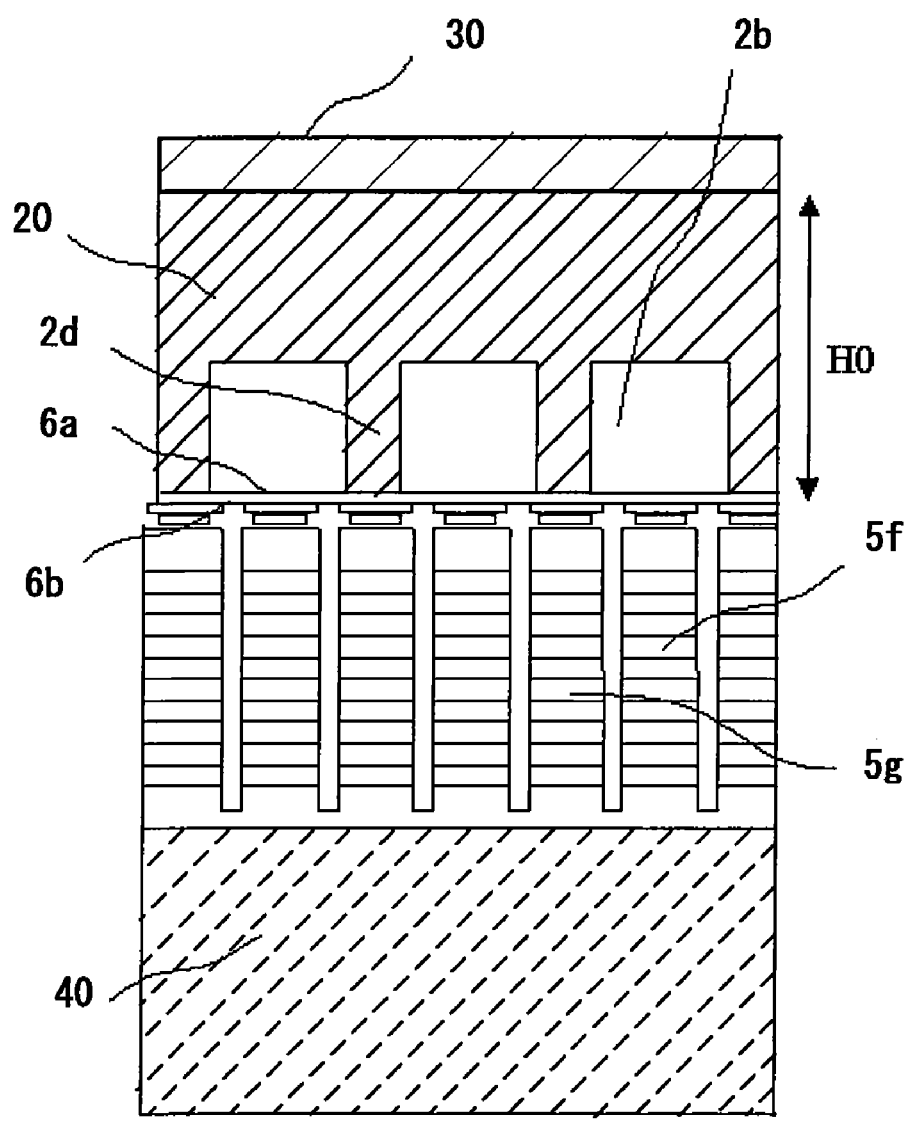
FIG. 7 is an extended schematic cross-sectional view of a substantial part of an example of an inkjet head of the present invention.

FIG. 6 is a schematic extended view of a substantial part of an inkjet head according to an embodiment of the present invention and FIG. 7 is an extended schematic cross-sectional view of a substantial part of the inkjet head in the direction between channels.

This inkjet head includes a frame 10 which has an engraving that functions as an ink inlet (not shown) and a common liquid chamber 1b, a liquid path panel 20 which as a communicating opening 2c that communicates with an engraving, that functions as a fluid resistance portion 2a and liquid pressuring chamber 2b, and a nozzle 3a, a vibration panel 60 that has a nozzle plate which forms the nozzle 3a, a convex portion 6a, a diaphragm portion 6b and an ink input opening 6c, a lamination piezoelectric device 50 connected to the vibration panel 60 via a adhesion layer 70, and a base 40 which fixes the lamination piezoelectric device 50.

The base 40 is made of barium titanate ceramic and two rows of the lamination piezoelectric device 50 are disposed and connected.

In the lamination piezoelectric device 50, a piezoelectric layer of lead zirconate titanate (PZT) having a thickness of 10 to 50 μm and internal electrode layer made of silver/palladium (Ag/Pd) having a thickness of some μm are alternately laminated. The internal electrode layer is connected to external electrode at two ends.

The piezoelectric device 50 is divided in a pectinate manner by half-cut dicing processing and each part is alternately used as driving part 5f and supporting part 5g (which is not driving part). The length of outer side of the external electrode is adjusted by notching or the like to be divided by the dicing processing to function as a plurality of independent electrodes. The other is not divided by dicing and is conducted to be a common electrode.

FPC8 is soldered to the independent electrode of the driving part. Moreover, the common electrode is connected to a GnD electrode of FPC8 by screwing the electrode into an electrode layer positioned in an end part of the lamination piezoelectric device. A driver IC (not shown) is mounted on the FPC8 and this controls driving voltage application to the driving part 5f.

The vibration panel 60 is formed by laminating a thick film portion including a beam which is connected to the supporting part, and Ni coating film made by electroforming twice on the thin film diaphragm portion 6b, convex island portion (island portion) 6a which is connected to the piezoelectric device 50 to be driving part 5f, and an opening which becomes the ink inlet 6c. The thickness of the diaphragm part is 3 μm and width thereof is 35 μm (one side).

The island convex portion 6a of the vibration panel 60, driving part 5f of the lamination piezoelectric device 50, the vibration panel 60 and the frame 10 are adhered by patterning an adhesion layer 70 which includes gap material.

For the liquid path plate 20, silicon single-crystal substrate is used and engraving functioning as the fluid resistance portion 2a and the liquid pressuring chamber 2b and a pass-through slot to be the communicating opening 2c which is located in a position that faces the nozzle 3a are patterned by etching method.

The part left after etching becomes bulkhead 2d of the liquid pressuring chamber 2b. Moreover, in this head, part where etching width is narrowed was set and the portion is fluid resistance portion 2a.

The nozzle plate 30 is formed by metal material such as Ni coating film by electroforming and forms a plurality of nozzle 3a which are fine outlets to spray ink droplets. The internal shape (inside shape) of the nozzle 3a is formed to have a shape of a horn (or may have subcolumnar or approximate conical trapezoid shape). Moreover, diameter of the nozzle 3a is, when measured on the ink droplet outlet side, 20 to 35 µm. Nozzle pitch of each row was 150 dpi.

Ink discharging surface of the nozzle plate 30 (nozzle surface side) is provided with water repellent processed layer 3b to which water repellent surface treatment has been processed. Water repellent film has been provided by methods such as PTFE-Ni eutectoid coating, electrodeposition coating of fluoroplastic, evaporation coating of evaporable fluoroplastic (such as fluoropitch), burning silicone resin or fluoroplastic solvent after application thereof and material of the water repellent film was selected depending on the property of ink so that shape of the ink droplet and spraying property thereof is stabilized and high quality image can be obtained. Many different materials are known as fluoroplastic. Among them, when the modified perfluoropolyoxetane (by Daikin Industries, Ltd., Optool DSX) is evaporation coated to have a thickness of 30 Å to 100 Å, a proper water repellency can be obtained.

An ink inlet and the frame 10 which forms engraving to be the common liquid chamber 1b are manufactured by molding.

The inkjet head thus manufactured discharges ink droplet from the nozzle 3a when driving wave (pulse voltage of 10 to 50V) is applied to the driving part 5f corresponding to a recording signal, which imposes displacement of driving part 5f to lamination layer side, causing liquid pressuring chamber 2b to be pressurized through the vibration plate 60 to increase the pressure.

Then, when the ink droplet discharging is finished, ink pressure in the liquid pressuring chamber 2b is decreased and because of inertia of ink flow and discharge process of driving pulse, negative pressure is generated in the liquid pressuring chamber 2b and the process proceeds to ink filling process. On this occasion, the ink supplied from the ink tank flows into the common liquid chamber 1b, and from the common liquid chamber 1b, flows through the ink inlet 6c and fluid resistance portion 2a to be filled in the liquid pressuring chamber 2b.

The fluid resistance portion 2a becomes resistance to refilling due to surface tension while it is effective to reduce residual pressure oscillation. By appropriately selecting the fluid resistance portion, reduction of pressure oscillation and refilling time can be well-balanced, shortening time required for shifting to the next ink droplet discharging (driving period).

(Ink Recorded Matter)

Any ink recorded matter by the inkjet recording apparatus or the inkjet recording method of the present invention is the ink recorded matter of the present invention. The ink recorded matter of the present invention includes image recorded by use of ink of the ink-media set on recording medium of the ink-media set of the present invention.

The record can be preferably used for various purposes as information materials to which various letters or image have been recorded because the record has high image quality without bleeding and superior temporal stability.

EXAMPLES

The present invention will be explained with reference to examples, to which the present invention should not be limited. In the following descriptions, all parts and % are expressed by mass unless indicated otherwise.

Preparation Example 1

Preparation of Copper Phthalocyanine Pigment Containing Polymer Fine Particle Dispersion A one-liter flask equipped with a stirrer, a thermometer, a nitrogen gas injection pipe, a reflux pipe and a dropping funnel was sufficiently replaced with nitrogen gas, then 11.2 g of styrene, 2.8 g of acrylic acid, 12.0 g of lauryl methacrylate, 4.0 g of polyethylene glycol methacrylate, 4.0 g of styrene macromer (by Toagosei Co., Ltd., AS-6), and 0.4 g of mercaptoethernol were mixed and the temperature was raised to 65° C. Then, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (by Toagosei Co., Ltd., AS-6), 3.6 g of mercaptoethernol, 2.4 g of azobisdimethylvaleronitrile, and 18 g of methyl ethyl ketone was added dropwise over 2.5 hrs.

After the adding the solution, a mixed solution of 0.8 g of azobisdimethylvaleronitrile, and 18 g of methyl ethyl ketone was added dropwise into the flask over 0.5 hr. After allowing to stand at 65° C. for 1 hr, 0.8 g of azobisdimethylvaleronitrile was added and allowed to stand for 1 hr still further. Following the reaction, 364 g of methyl ethyl ketone was added into the flask to obtain 800 g of polymer solution having a concentration of 50% by mass. A part of the polymer solution was dried and measured by gel permeation chromatography (standard: polyethylene, solvent: tetrahydrofuran) and the molecular weight was determined as 15,000.

Then, 28 g of the resulting polymer solution, 26 g of copper phthalocyanine pigment, 13.6 g of 1 mol/L solution of potassium hydroxide, 20.0 g of methyl ethyl ketone, and 30 g of deionized water were sufficiently stirred. Then, by use of a three-roll mill (Noritake Co., Ltd., NR-84A), the mixture was kneaded 20 times. The resulting paste was poured into 200 g of deionized water and mixed sufficiently. Methyl ethyl ketone and water were removed by an evaporator and 160 g of blue polymer fine particle dispersion of which solid content was 20% by mass.

Average particle size (D50%) of the obtained polymer fine particle measured by a particle size distribution measuring device (by Nikkiso Co., Ltd., Microtrac UPA) was 93 nm.

Preparation Example 2

Preparation of Dimethylquinacridone Pigment Containing Polymer Fine Particle Dispersion Except for changing copper phthalocyanine pigment to C.I. pigment red 122, same procedures as those of the preparation Example 1 were taken to prepare magenta polymer fine particle dispersion.

Average particle size (D50%) of the obtained polymer fine particle measured by a particle size distribution measuring device (by Nikkiso Co., Ltd., Microtrac UPA) was 127 nm.

Preparation Example 3

Preparation of Monoazo Yellow Pigment Containing Polymer Fine Particle Dispersion Except for changing copper phthalocyanine pigment to C.I. pigment yellow 74, same procedures as those of the preparation Example 1 were taken to prepare yellow polymer fine particle dispersion. Average particle size (D50%) of the obtained polymer fine particle measured by a particle size distribution measuring device (by Nikkiso Co., Ltd., Microtrac UPA) was 76 nm.

Preparation Example 4

Preparation of Carbon Black Dispersion Treated by Sulfonating Agent 150 g of commercially available carbon black pigment (by Degussa Japan, Printex No. 85) was mixed and stirred in 400 ml of sulfolane, nano-dispersed by a bead mill, added with 15 g of sulfamic acid, and stirred for 10 hrs at the temperature of 140 to 150° C. Obtained slurry was poured into 1000 ml of deionized water and processed by a centrifugal machine with 12,000 rpm to obtain surface processed carbon black wet cake. The obtained carbon black wet cake was dispersed in 2,000 ml of deionized water again, pH thereof was adjusted by lithium hydroxide, demineralized and concentrated by ultrafilter membrane to form carbon black dispersion of which pigment concentration was 10% by mass, filtered by nylon filter having an average pore diameter of 1 μm, and carbon black dispersion was obtained.

Average particle size (D50%) of the obtained carbon black dispersion measured by a particle size distribution measuring device (by Nikkiso Co., Ltd., Microtrac UPA) was 80 nm.

Preparation Example 5

Preparation of Carbon Black Containing Polymer Fine Particle Dispersion

Except for changing copper phthalocyanine pigment to carbon black (by Degussa Japan, FW100), same procedures as those of the preparation Example 1 were taken to prepare black polymer fine particle dispersion.

Average particle size (D50%) of the obtained polymer fine particle measured by a particle size distribution measuring device (by Nikkiso Co., Ltd., Microtrac UPA) was 104 nm.

Example 1

Production of Cyan Ink 20.0% by mass of copper phthalocyanine pigment containing polymer fine particle dispersion of the Preparation Example 1, 23.0% by mass of 3-methy-1,3-butanediol, 8.0% by mass of glycerin, 2.0% by mass of 2-ethyl-1,3-hexanediol, 2.5% by mass of FS-300 (by DuPont Co.) as fluorochemical surfactant, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a cyan ink was produced.

Example 2

Production of Magenta Ink 20.0% by mass of dimethylquinacridone pigment containing polymer fine particle dispersion of Preparation Example 2, 22.5% by mass of 3-methy-1,3-butanediol, 9.0% by mass of glycerin, 2.0% by mass of 2-ethyl-1,3-hexanediol, 2.5% by mass of FS-300 (by DuPont Co.) as fluorochemical surfactant, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a magenta ink was produced.

Example 3

Production of Yellow Ink 20.0% by mass of monoazo yellow pigment containing polymer fine particle dispersion of Preparation Example 3, 24.5% by mass of 3-methy-1,3-butanediol, 8.0% by mass of glycerin, 2.0% by mass of 2-ethyl-1,3-hexanediol, 2.5% by mass of FS-300 (by DuPont Co.) as fluorochemical surfactant, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a yellow ink was produced.

Example 4

Production of Black Ink 20.0% by mass of carbon black dispersion of Preparation Example 4, 22.5% by mass of 3-methy-1,3-butanediol, 7.5% by mass of glycerin, 2.0% by mass of 2-pyrrolidone, 2.0% by mass of 2-ethyl-1,3-hexanediol, 2.5% by mass of FS-300 (by DuPont Co.) as fluorochemical surfactant, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a black ink was produced.

Comparative Example 1

Production of Cyan Ink 20.0% by mass of copper phthalocyanine pigment containing polymer fine particle dispersion of the Preparation Example 1, 23.0% by mass of 3-methy-1,3-butanediol, 8.0% by mass of glycerin, 2.0% by mass of 2-ethyl-1,3-hexanediol, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a cyan ink was produced.

Comparative Example 2

Production of Magenta Ink 20.0% by mass of dimethylquinacridone pigment containing polymer fine particle dispersion of Preparation Example 2, 22.5% by mass of 3-methy-1,3-butanediol, 9.0% by mass of glycerin, 2.0% by mass of 2-ethyl-1,3-hexanediol, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a magenta ink was produced.

Comparative Example 3

Production of Yellow Ink 20.0% by mass of monoazo yellow pigment containing polymer fine particle dispersion of Preparation Example 3, 24.5% by mass of 3-methy-1,3-butanediol, 8.0% by mass of glycerin, 2.0% by mass of 2-ethyl-1,3-hexanediol, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a yellow ink was produced.

Comparative Example 4

Production of Black Ink 20.0% by mass of carbon black dispersion of Preparation Example 4, 22.5% by mass of 3-methy-1,3-butanediol, 7.5% by mass of glycerin, 2.0% by mass of 2-pyrrolidone, 2.0% by mass of 2-ethyl-1,3-hexanediol, 0.2% by mass of Proxel LV (by Avecia Co.), 0.5% by mass of 2-amino-2-ethyl-1,3-propanediol, and appropriate amount of deionized water were mixed to make the mixture 100% by mass. Then, it was filtered by a membrane filter having an average pore size of 0.8 μm. Thus, a black ink was produced.

Example 5

Production of Cyan Ink

Ink composition described below was prepared and 10% by mass solution of lithium hydroxide was added thereto to adjust pH thereof to be 9. Then, it was filtered by a membrane filter having an average pore size of 0.8 μm. Thus, a cyan ink was produced.

| | |
|---|---|
| Polymer Fine Particles [1] | 8.0% [2] |
| Triethylene glycol | 22.5% |
| Glycerin | 7.5% |
| 2-Pyrrolidone | 5.0% |
| Surfactant [3] | 5.0% |
| 2-Ethyl-1,3-hexanediol | 2.0% |
| Proxel LV [4] | 0.1% |
| Deionized water | remainder |

[1] Preparation Example 1, containing a phthalocyanine pigment
[2] solid content
[3] expressed by $CH_3(CH_2)_{12}O(CH_2CH_2O)_3CH_2COOH$
[4] fungicide, 20% by mass of active ingredient

Example 6

Production of Magenta Ink

Except for using following composition, similar method as that of the Example 5 was used and pH was adjusted to 9 by use of lithium hydroxide to manufacture magenta ink.

| | |
|---|---|
| Polymer Fine Particles [1] | 8.0% [2] |
| Propylene glycol | 30.0% |
| Glycerin | 10.0% |
| N-methyl-2-pyrrolidone | 2.0% |
| Surfactant [3] | 2.0% |
| 2-2,4-Trimethyl-1,3-pentanediol | 2.0% |
| Proxel LV [4] | 0.1% |
| Deionized water | remainder |

[1] Preparation Example 2, containing a dimethylquinacridone pigment
[2] solid content
[3] expressed by $CH_3(CH_2)_{12}O(CH_2CH_2O)_4CH_2COOH$
[4] fungicide, 20% by mass of active ingredient

Example 7

Production of Yellow Ink

Except for using following composition, similar method as that of the Example 5 was used and pH was adjusted to 9 by use of lithium hydroxide to manufacture yellow ink.

| | |
|---|---|
| Polymer Fine Particles [1] | 8.0% [2] |
| 1,3-Butanediol | 22.5% |
| Glycerin | 7.5% |
| 2-Pyrrolidone | 5.0% |
| Surfactant [3] | 2.0% |
| 2-2,4-Trimethyl-1,3-pentanediol | 2.0% |
| Proxel LV [4] | 0.1% |
| Deionized water | remainder |

[1] Preparation Example 3, containing a monoazo yellow pigment
[2] solid content
[3] expressed by $CH_3(CH_2)_{12}O(CH_2CH_2O)_6CH_2COOH$
[4] fungicide, 20% by mass of active ingredient

Example 8

Production of Black Ink

Except for using following composition, similar method as that of the Example 5 was used and pH was adjusted to 9 by use of lithium hydroxide to manufacture black ink.

| | |
|---|---|
| Polymer Fine Particles [1] | 8.0% [2] |
| Dipropylene glycol | 20.0% |
| Glycerin | 10.0% |
| N-hydroxyethyl-2-pyrrolidone | 5.0% |
| Surfactant [3] | 2.0% |
| 2-Ethyl-1,3-hexanediol | 2.0% |
| Proxel LV [4] | 0.1% |
| Deionized water | remainder |

[1] Preparation Example 5, containing a carbon black
[2] solid content
[3] expressed by $CH_3(CH_2)_{12}O(CH_2CH_2O)_5CH_2COOH$
[4] fungicide, 20% by mass of active ingredient

Comparative Example 5

Production of Cyan Ink

Except for using following composition, similar method as that of the Example 1 was used to manufacture cyan ink.

| | |
|---|---|
| Polymer Fine Particle Dispersion [1] | 20.0% |
| 1,3-Butanediol | 20.0% |
| Glycerin | 7.5% |

-continued

| 2-2,4-Trimethyl-1,3-pentanediol | 1.0% |
| F-1405 [2] | 0.5% |
| Deionized water | remainder |

[1] Preparation Example 1, containing a monoazo yellow pigment
[2] by Dainippon Ink and Chemicals, Inc.

Comparative Example 6

Production of Magenta Ink

Except for using following composition, similar method as that of the Example 1 was used to manufacture magenta ink.

| Polymer Fine Particle Dispersion [1] | 20.0% |
| 1,3-Butanediol | 18.0% |
| Glycerin | 6.0% |
| 2-2,4-Trimethyl-1,3-pentanediol | 1.0% |
| FC-4430 [2] | 0.5% |
| Deionized water | remainder |

[1] Preparation Example 2, containing a dimethylquinacridone pigment
[2] by Sumitomo 3M Co.

Comparative Example 7

Production of Yellow Ink

Except for using following composition, similar method as that of the Example 1 was used to manufacture yellow ink.

| Polymer Fine Particle Dispersion [1] | 20.0% |
| 3-Methyl-1,3-Butanediol | 18.0% |
| Glycerin | 6.0% |
| 2-2,4-Trimethyl-1,3-pentanediol | 1.0% |
| FC-4430 [2] | 0.5% |
| Deionized water | remainder |

[1] Preparation Example 3, containing a monoazo yellow pigment
[2] by Sumitomo 3M Co.

Comparative Example 8

Production of Black Ink

Except for using following composition, similar method as that of the Example 1 was used to manufacture black ink.

| Carbon Black Dispersion [1] | 20.0% |
| 1,5-Pentanediol | 18.0% |
| Glycerin | 6.0% |
| Urea | 1.5% |
| 2-2,4-Trimethyl-1,3-pentanediol | 1.0% |
| F-1405 [2] | 0.5% |
| Deionized water | remainder |

[1] Preparation Example 4, treated by sulfonating agent
[2] by Dainippon Ink and Chemicals, Inc.

For each of the inks obtained by Examples 1 to 8 and Comparative Examples 1 to 8, surface tension and viscosity were measured by the following method. The results are shown in Table 3.

<Measurement of Viscosity>

Viscosity was measured by use of R-500 type viscometer (by Toki Sangyo Co.) under the condition where cone 1°34'× R24, 60 rpm, 3 minutes later. Temperature when measured was 25° C.

<Measurement of Surface Tension>

Surface tension was measured by use of a surface tensiometer (by Kyowa Interface Science Co., CBVP-Z). Static surface tension was measured using a platinum plate in 25° C.

Production Example 1

Manufacture of Support 0.3% by mass of slurry containing the following composition is made by a fourdrinier to manufacture a support of which the amount is 79 g/m$^2$. Note that in the size press stage of papermaking process, oxidized starch solution was applied on both surfaces. Application was performed so that adhesion of solid on one surface became 1.0 g/m$^2$.

| Hardwood bleached Kraft pulp (LBKP) | 80 parts |
| Softwood bleached Kraft pulp (NBKP) | 20 parts |
| Light weight calcium carbonate [1] | 10 parts |
| Aluminum sulfate | 1.0 part |
| Amphoteric starch [2] | 1.0 part |
| Nonionic rosin sizing agent [3] | 0.3 part |
| Yield enhancer [4] | 0.02 part |

[1] TP-121, by Okutama Kogyo Co., Ltd.
[2] Cato 3210, by Nippon NSC Co.
[3] NeuSize M-10, by Harima Chemicals, Inc.
[4] NR-11LS, by Hymo Co., Ltd Production Example 2

Manufacturing Recording Medium 1

70 parts by mass of clay 70 having 97% by mass of particles as pigment, particles of which size is smaller than 2 μm, 30 parts by mass of heavy calcium carbonate having an average particle size of 1.1 μm, 8 parts by mass of styrene-butadiene co-polymer emulsion of which glass transition temperature (Tg) as an adhesive is −5° C., 1 part by mass of phosphate starch, and 0.5 part by mass of calcium stearate as an auziliary agent were added together and then water was added to prepare coating liquid having 60% by mass of solid concentration.

The obtained coating liquid was applied by a blade coater on both surfaces of the aforementioned support so that adhesion of solid on one surface became 8.0 g/m$^2$. After hot-air drying, super calendar treatment was performed to manufacture a "Recording Medium 1".

Production Example 3

Manufacturing Recording Medium 2

70 parts by mass of clay 70 having 97% by mass of particles as pigment, particles of which size is smaller than 2 μm, 30 parts by mass of heavy calcium carbonate having an average particle size of 1.1 μm, 7 parts by mass of styrene-butadiene co-polymer emulsion of which glass transition temperature (Tg) as an adhesive is −5° C., 0.7 part by mass of phosphate starch, and 0.5 part by mass of calcium stearate as an auziliary agent were added together and then water was added to prepare coating liquid having 60% by mass of solid concentration.

The obtained coating liquid was applied by a blade coater on both surfaces of the aforementioned support so that adhesion of solid on one surface became 8.0 g/m². After hot-air drying, super calender treatment was performed to manufacture a "Recording Medium 2".

<Measurement of Ink Transfer Rate using Dynamic Scanning Absorptometer>

Recording medium 1 and a dynamic scanning absorptometer (Type D, K350 series, Kyowa Seiko Co., Ltd.) were used to measure the ink transfer rates for the respective recording inks of Examples 1 to 8 and Comparative Examples of 1 to 8. The transfer rates in 100 ms and 400 ms of contact time were determined from interpolation of the measured value of transfer rate in contact time which is in the vicinity of each of the contact time. Measurement was conducted under the condition of 23° C. and 50% RH. The results are shown in Table 3.

TABLE 3

|  | Viscosity (mPa·s) | Surface Tension (mN/m) | Transfer Rate of Ink (ml/m²) | |
|---|---|---|---|---|
|  |  |  | Contact Time 100 ms | Contact Time 400 ms |
| Example 1 | 8.05 | 25.4 | 7.2 | 14.8 |
| Example 2 | 8.09 | 25.4 | 7.3 | 15.0 |
| Example 3 | 8.11 | 25.7 | 7.1 | 14.5 |
| Example 4 | 8.24 | 25.4 | 7.0 | 14.3 |
| Com. Ex. 1 | 8.02 | 37.5 | 2.7 | 4.1 |
| Com. Ex. 2 | 8.06 | 37.6 | 2.5 | 4.0 |
| Com. Ex. 3 | 8.08 | 37.8 | 2.4 | 3.8 |
| Com. Ex. 4 | 8.16 | 37.4 | 2.7 | 4.0 |
| Example 5 | 6.26 | 33.1 | 6.6 | 12.4 |
| Example 6 | 7.57 | 32.3 | 6.4 | 12.0 |
| Example 7 | 6.13 | 32.8 | 6.7 | 12.5 |
| Example 8 | 8.06 | 31.4 | 6.1 | 11.7 |
| Com. Ex. 5 | 7.14 | 18.4 | 7.8 | 15.6 |
| Com. Ex. 6 | 7.61 | 18.0 | 7.6 | 15.2 |
| Com. Ex. 7 | 7.01 | 18.5 | 8.0 | 15.9 |
| Com. Ex. 8 | 7.30 | 18.3 | 7.7 | 15.4 |

Example 9

Ink Set, Recording Medium and Image Recording

"Ink set 1" was prepared by an ordinary method of combining black ink of Example 4, yellow ink of Example 3, magenta ink of Example 2, and cyan ink of Example 1.

Using the resulting ink set 1 and the recording medium 1, printing of letters was performed by use of a prototype of drop-on-demand printer with the following setting; photo quality of 300 dpi and maximum ink droplet 18 pl. Total volume of secondary color was controlled to be 140% and adhesion amount was controlled. Solid image and letters were printed to obtain a printed image. Note that on the nozzle plate surface of the printer, silicone resin film (room-temperature curable silicone resin SR 2411, by Dow Corning Toray Co.) has been formed the thickness, surface roughness (Ra), and critical surface tension thereof was 1.2 µm, 0.18 µm and 21.6 mN/m, respectively.

Example 10

Ink Set, Recording Medium and Image Recording

Except for using the recording medium 2 instead of the recording medium 1, same procedures as those of the Example 9 were conducted, and a printed image was obtained.

Example 11

Ink Set, Recording Medium and Image Recording

Except for using gravure printing coated paper (Space DX, amount: 56 g/m³, by Nippon Paper Industries Co., referred to as "recording medium 3") as a recording medium, the same procedures as Example 9 were conducted, and a printed image was obtained.

Example 12

Ink Set, Recording Medium and Image Recording

Except for using an ink set 3 including black ink of Example 8, yellow ink of Example 7, magenta ink of Example 6, and cyan ink of Example 5 and using the recording medium 1 as the recording medium, the same procedures as Example 9 were conducted, and a printed image was obtained.

Example 13

Ink Set, Recording Medium and Image Recording

Except for using the ink set 3 instead of the ink set 1 and using the recording medium 2, the same procedures as Example 9 were conducted, and a printed image was obtained.

Example 14

Ink Set, Recording Medium and Image Recording

Except for using the ink set 3 instead of the ink set 1 and using the recording medium 3, the same procedures as Example 9 were conducted, and a printed image was obtained.

Comparative Example 9

Ink Set, Recording Medium and Image Recording

Except for using offset coated paper (Aurora Coat, amount: 104.7 g/m², by Nippon Paper Industries Co., referred to as "recording medium 4") as recording medium, the same procedures as Example 9 were conducted, and a printed image was obtained.

Comparative Example 10

Ink Set, Recording Medium and Image Recording

Except for using inkjet matt coated paper (Super Fine paper, by Seiko Epson Co., referred to as "recording medium 5") as recording medium, the same procedures as Example 9 were conducted, and a printed image was obtained.

Comparative Example 11

Ink Set, Recording Medium and Image Recording

Except for using an ink set 2 including black ink of Comparative Example 4, yellow ink of Comparative Example 3, magenta ink of Comparative Example 2, and cyan ink of Comparative Example 1 and using the recording medium 1 as recording medium, the same procedures as Example 9 were conducted, and a printed image was obtained.

Comparative Example 12

Ink Set, Recording Medium and Image Recording

Except for using the ink set 2 instead of the ink set 1 and using the "recording medium 4" as recording medium, the same procedures as Example 9 were conducted, and a printed image was obtained.

Comparative Example 13

Ink Set, Recording Medium and Image Recording

Except for using the ink set 2 instead of the ink set 1 and using the "recording medium 5" as recording medium, the same procedures as Example 9 were conducted to perform printing and a printed image was obtained.

Comparative Example 14

Ink Set, Recording Medium and Image Recording

Except for using the ink set 2 instead of the ink set 1 and using the "recording medium 2" as recording medium, the same procedures as Example 9 were conducted, and a printed image was obtained.

Comparative Example 15

Ink Set, Recording Medium and Image Recording

Except for using an ink set 4 including black ink of Comparative Example 8, yellow ink of Comparative Example 7, magenta ink of Comparative Example 6, and cyan ink of Comparative Example 5 and using the "recording medium 1" as recording medium, the same procedures as Example 9 were conducted, and a printed image was obtained.

The surface tension of the ink of Comparative Example 15 was too low and wetted a nozzle plate, and a significant amount of ink did not go straight from the early stage of image recording; therefore, following evaluation was not conducted for this ink set.

For the recording media 1 to 5, transfer rate of pure water and cyan ink of Example 1 (surface tension: 25.4 mN/m) were measured by the following method using a dynamic scanning absorptometer. The results are shown in Table 4.

Further, for the recording media 1 and 2 and the recording media 4 and 5, the transfer rate of cyan ink of the Comparative Example 1 (surface tension: 37.5 mN/m) was measured by the following method using a dynamic scanning absorptometer. The results are shown in Table 5.

In addition, for the recording media 1 to 3, transfer rate of cyan ink of Example 5 (surface tension 33.1 mN/m) was measured by the following method using a dynamic scanning absorptometer. The results are shown in Table 6.

<Measurement of Ink Transfer Rate Using Dynamic Scanning Absorptometer>

The ink transfer rates of pure water or cyan ink were measured as to the respective recording media by use of the dynamic scanning absorptometer (Type D, K350 series, Kyowa Seiko Co., Ltd.) were used to measure. The transfer rates in 100 ms and 400 ms of contact time were determined from interpolation of the measured value of transfer rate in contact time which is in the vicinity of each of the contact time. Measurement was conducted under the condition of 23° C. and 50% RH.

TABLE 4

| Recording Medium | Pure Water | | Cyan Ink of Example 1 | |
|---|---|---|---|---|
| | Contact Time 100 ms | Contact Time 400 ms | Contact Time 100 ms | Contact Time 400 ms |
| Recording Medium 1 | 10.1 ml/m$^2$ | 20.2 ml/m$^2$ | 7.2 ml/m$^2$ | 14.8 ml/m$^2$ |
| Recording Medium 2 | 25.2 ml/m$^2$ | 28.5 ml/m$^2$ | 14.6 ml/m$^2$ | 19.4 ml/m$^2$ |
| Recording Medium 3 | 10.4 ml/m$^2$ | 21.8 ml/m$^2$ | 6.4 ml/m$^2$ | 8.8 ml/m$^2$ |
| Recording Medium 4 | 2.8 ml/m$^2$ | 3.4 ml/m$^2$ | 2.7 ml/m$^2$ | 3.1 ml/m$^2$ |
| Recording Medium 5 | 41.0 ml/m$^2$ | 44.8 ml/m$^2$ | 38.1 ml/m$^2$ | 46.2 ml/m$^2$ |

TABLE 5

| Recording Medium | Cyan Ink of Comparative Example 1 | |
|---|---|---|
| | Contact Time 100 ms | Contact Time 400 ms |
| Recording Medium 1 | 2.7 ml/m$^2$ | 4.1 ml/m$^2$ |
| Recording Medium 2 | 3.8 ml/m$^2$ | 5.6 ml/m$^2$ |
| Recording Medium 4 | 0.6 ml/m$^2$ | 0.9 ml/m$^2$ |
| Recording Medium 5 | 31.3 ml/m$^2$ | 36.8 ml/m$^2$ |

TABLE 6

| Recording Medium | Cyan Ink of Example 5 | |
|---|---|---|
| | Contact Time 100 ms | Contact Time 400 ms |
| Recording Medium 1 | 6.6 ml/m$^2$ | 12.4 ml/m$^2$ |
| Recording Medium 2 | 10.0 ml/m$^2$ | 16.1 ml/m$^2$ |
| Recording Medium 3 | 5.8 ml/m$^2$ | 7.9 ml/m$^2$ |

Then, evaluation for the respective printed images of the Examples 9 to 14 and Comparative Examples 9 to 14 were performed in terms of beading, bleed, spur mark and brilliance. The results are shown in Table 7.

<Beading>

Degree of beading in image printed in green in each of printed image was observed with eyes and evaluated by the following standards. Note that raking example of beading is shown in FIG. 19 (in the figure, it is shown in white and black, though is actually printed in green).

[Evaluation Standards]

Rank 4: No beading occurred, uniformly printed
Rank 3: Little beading can be found
Rank 2: Apparent beading can be found
Rank 1: Significant amount of beading can be found <Evaluation of Bleed>

Degree of bleed in image printed in black on yellow in each of printed image was observed with eyes and evaluated by the following standards.

[Evaluation Standards]
A: No bleed occurred and image is clearly printed
B: Little bleed can be found
C: Apparent bleed can be found
D: Bleed occurred and outline of a letter became unclear
<Evaluation of Blur Mark>
A: No blur mark can be found
B: Little blur mark can be found
C: Blue mark can be found
D: Blur mark can be clearly found
<Evaluation of Gloss Level>
Solid images of respective prints were measured in terms of 60° specular gloss level (JIS Z8741).

TABLE 7

|  | Beading (Rank) | Bleed | Spur mark | Gloss Level in Cyan Image |
|---|---|---|---|---|
| Example 9 | 3 | B | B | 29.4 |
| Example 10 | 4 | A | A | 27.8 |
| Example 11 | 3 | B | B | 22.3 |
| Com. Ex. 9 | 1 | C | C | 32.1 |
| Com. Ex. 10 | 4 | A | A | 1.7 |
| Com. Ex. 11 | 1 | D | C | 30.6 |
| Com. Ex. 12 | 1 | D | C | 33.4 |
| Com. Ex. 13 | 4 | A | A | 1.9 |
| Com. Ex. 14 | 2 | C | C | 28.6 |
| Example 12 | 3 | B | B | 29.8 |
| Example 13 | 3 | B | B | 28.1 |
| Example 14 | 3 | B | B | 22.9 |

From the results of Tables 3 to 7, it is demonstrated that the ink-media sets of Examples 9 to 14 are excellent entirely with respect to beading, bleed, blur mark, and gloss in comparison with Comparative Examples 9 to 14.

Industrial Applicability

The ink-media set according to the present invention formed of is the inventive recording ink and the inventive recording medium can bring about high-quality recording of (i) letters with so-called "clear edge", or excellent and glossy recorded images with superior printing quality without blur, feathering and bleed at surround of images, (ii) recorded images with higher optical densities, and (iii) highly uniform images without beading at flat-thick portions, by way of combining a recording media having a texture similar to that of coat paper for offset printing and a certain liquid-absorbability as well as an ink with a certain surface tension, accordingly, can be appropriately utilized for inkjet recording methods, inkjet recording apparatuses, and ink recorded matters.

The ink jet recording apparatus and inkjet recording method according to the present invention can be applied to various types of recordings on the basis of inkjet type, and properly applied to, for example, inkjet recording printers, facsimile devices, copiers, and hybrid apparatuses of printer/facsimile/copier etc.

The invention claimed is:
1. An ink-media set, comprising recording inks, and a recording medium, wherein each of the recording inks comprises water, a colorant and a humectant, and wherein each of the recording inks has a surface tension of 20 mN/m to 35 mN/m at 25° C.;
   wherein the recording medium comprises a substrate and a coating layer which is formed on at least one surface of the substrate; and
   the transfer rate of the recording ink to the recording medium, as measured with a dynamic scanning absorptometer, is 4 ml/m² to 15 ml/m² at a contact time of 100 ms and is 7 ml/m² to 20 ml/m² at a contact time of 400 ms;
   wherein the coating layer comprises at least a pigment and a water-based resin as a binder, and the added amount of the water-based resin is 7 parts by mass to 8 parts by mass based on 100 parts by mass of the pigment in the coating layer.
2. The ink-media set according to claim 1, wherein the colorant is one selected from pigments having an anionic hydrophilic group and pigments coated with a polymer having an anionic hydrophilic group.
3. The ink-media set according to claim 2, wherein the volume average particle size of the pigment is 0.01 µm to 0.16 µm.
4. The ink-media set according to claim 1, wherein the colorant is colored fine particles that include at least one of pigments and dyes.
5. The ink-media set according to claim 4, wherein the volume average particle size of the colored fine particles is 0.01 µm to 0.16 µm.
6. The ink-media set according to claim 1, wherein the humectant is at least one selected from the group consisting of polyol compounds, lactam compounds, urea compounds and saccharides.
7. The ink-media set according to claim 6, wherein
   the polyol compound is at least one selected from the group consisting of glycerin, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,4-butanediol, 1,5-pentanediol, 1,6-hexanediol, 2-methyl-2,4pentanediol, 1,2,4-butanetriol, 1,2,6-hexanetriol, thiodiglycol, pentaerythritol, trimethylolethane and trimethylolpropane.
8. The ink-media set according to claim 6, wherein the lactam compound is as least one selected from 2-pyrrolidone, N-methyl-2-pyrrolidone, N-hydroxyethyl-2-pyrrolidone and ε-caprolactam.
9. The ink-media set according to claim 1, wherein the content of the humectant is 10% by mass to 50% by mass in each of the recording inks.
10. The ink-media set according to claim 1, wherein each of the recording inks further comprises a wetting agent, and the wetting agent is one selected from polyol compounds and glycol ether compounds having 8 or more carbon atoms.
11. The ink-media set according to claim 10, wherein the polyol compound having 8 or more carbon atoms is at least one of 2-ethyl-1,3-hexanediol and 2,2,4-trimethyl-1,3-pentanediol.
12. The ink-media set according to claim 1, further comprising a surfactant which is at least one expressed by the following general formulas (I) to (VI):

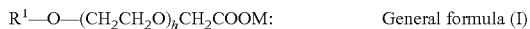

in the general formula (I), $R^1$ represents an alkyl group; h represents an integer from 3 to 12; M represents one selected from alkali metal ions, quaternary ammoniums, quaternary phosphoniums and alkanolamines;

General formula (II)

in the general formula (II), $R^2$ represents an alkyl group; M represents one selected from alkali metal ions, quaternary ammoniums, quaternary phosphoniums, and alkanolamines;

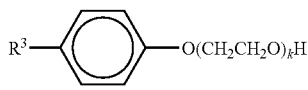   General formula (III)

in the general formula (III), $R^3$ represents a hydrocarbon group; k represents an integer from 5 to 20;

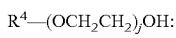   General formula (IV)

in the general formula (IV), R4 represents a hydrocarbon group; j represents an integer from 5 to 20;

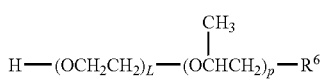   General formula (V)

in the general formula (V), $R^6$ represents a hydrocarbon group; L and p represent each an integer from 1 to 20;

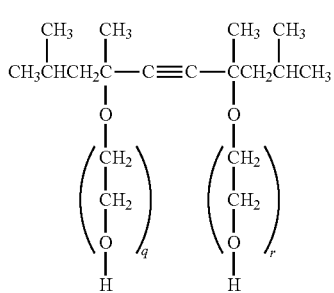   General formula (VI)

in the general formula (VI), q and r represent each an integer from 0 to 40.

13. The ink-media set according to claim 1, wherein each of the recording inks has a viscosity of 5 mPa·s or more at 25° C.

14. The ink-media set according to claim 1, wherein the transfer rate of pure water to the recording medium, as measured with a dynamic scanning absorptometer, is 2 ml/m² to 26 ml/m² at a contact time of 100 ms and is 3 ml/m² to 29 ml/m² at a contact time of 400 ms.

15. An inkjet recording method, comprising
stimulating each ink in an ink-media set and ejecting the ink to a recording medium in the ink-media set to thereby form an image to the recording medium in the ink-media set which comprises:
the recording inks and the recording medium,
wherein each of the recording inks comprises water, a colorant and a humectant and has a surface tension of 20 mN/m to 35 mN/m at 25° C.; the recording medium comprises a substrate and a coating layer which is formed on at least one surface of the substrate; the transfer rate of each of the recording inks to the recording medium, as measured with a dynamic scanning absorptometer, is 4 ml/m² to 15 ml/m² at a contact time of 100 ms and is 7 ml/m² to 20 ml/m² at a contact time of 400 ms;
wherein the coating layer comprises at least a pigment and a water-based resin as a binder, and the added amount of the water-based resin is 7 parts by mass to 8 parts by mass based on 100 parts by mass of the pigment in the coating layer.

16. The inkjet recording method according to claim 15, wherein the applied amount of the ink is 8 g/m² to 20 g/m² at a maximum when the resolution is 300 dpi or higher.

17. The inkjet recording method according to claim 15, wherein an ink-repellent layer is provided on a plate surface on which an ink-ejecting aperture of an inkjet head is formed for spraying the ink.

18. The inkjet recording method according to claim 17, wherein the ink-repellent layer comprises any one of a fluorine material and a silicone material.

19. The inkjet recording method according to claim 17, wherein the surface roughness (Ra) of the ink-repellent layer is 0.2 μm or less.

* * * * *